(12) United States Patent
Okada

(10) Patent No.: US 11,182,061 B2
(45) Date of Patent: Nov. 23, 2021

(54) DISPLAY CONTROL METHOD, RECORDING MEDIUM STORING PROGRAM, TERMINAL

(71) Applicant: LINE Corporation, Tokyo (JP)

(72) Inventor: Tomohiro Okada, Tokyo (JP)

(73) Assignee: LINE CORPORATION, Tokyo (JP)

( * ) Notice: Subject to any disclaimer, the term of this patent is extended or adjusted under 35 U.S.C. 154(b) by 38 days.

(21) Appl. No.: 16/116,477

(22) Filed: Aug. 29, 2018

(65) Prior Publication Data

US 2019/0012070 A1    Jan. 10, 2019

Related U.S. Application Data

(63) Continuation of application No. PCT/JP2017/008501, filed on Mar. 3, 2017.

(30) Foreign Application Priority Data

Mar. 3, 2016   (JP) .............................. JP2016-041463

(51) Int. Cl.
    *G06F 15/16*    (2006.01)
    *G06F 3/0484*    (2013.01)
    (Continued)

(52) U.S. Cl.
    CPC .......... *G06F 3/04847* (2013.01); *G06F 13/00* (2013.01); *H04L 12/185* (2013.01);
    (Continued)

(58) Field of Classification Search
    CPC .. G06F 3/04847; G06F 13/00; G06F 3/04845; H04M 11/00; H04M 1/72552; H04L 12/1813; H04L 12/185; H04L 51/32
    See application file for complete search history.

(56) References Cited

U.S. PATENT DOCUMENTS

| 6,630,944 B1 | 10/2003 | Kakuta et al. |
| 2005/0108329 A1* | 5/2005 | Weaver ................... H04L 51/04 709/204 |

(Continued)

FOREIGN PATENT DOCUMENTS

| JP | H10283282 A | 10/1998 |
| JP | 2000-267976 A | 9/2000 |

(Continued)

OTHER PUBLICATIONS

Korean Office Action dated Mar. 12, 2020, issued in corresponding Korean Patent Application No. 10-2018-7021302.

(Continued)

*Primary Examiner* — John B Walsh
(74) *Attorney, Agent, or Firm* — Harness, Dickey & Pierce, P.L.C.

(57) ABSTRACT

A display control method is provided on a terminal of a user belonging to a group to transmit and receive a content with a terminal of another user belonging to the group via an information processing apparatus. The display control method includes displaying on a screen, in response to receiving from the user a selection of a part of users belonging to the group, a content having the part of the users as a sender in a displaying aspect different from a displaying aspect of other contents; transmitting to the information processing apparatus, in response to receiving a command from the user, a request for activating an individual process of individually transmitting and receiving the content with a terminal of the part of the users; and executing the individual process in response to receiving a response indicating that the individual process has been activated.

20 Claims, 21 Drawing Sheets

(51) Int. Cl.
    *H04M 11/00*     (2006.01)
    *G06F 13/00*     (2006.01)
    *H04M 1/72436*     (2021.01)
    *H04L 12/18*     (2006.01)
    *H04L 12/58*     (2006.01)

(52) U.S. Cl.
    CPC .......... *H04L 12/1813* (2013.01); *H04L 51/32* (2013.01); *H04M 1/72436* (2021.01); *H04M 11/00* (2013.01); *G06F 3/04845* (2013.01)

(56) References Cited

U.S. PATENT DOCUMENTS

| | | | |
|---|---|---|---|
| 2012/0202428 A1* | 8/2012 | Mirbaha | G06Q 50/01 455/41.2 |
| 2013/0069969 A1 | 3/2013 | Chang et al. | |
| 2014/0164957 A1* | 6/2014 | Shin | G06F 3/0481 715/753 |
| 2014/0298210 A1 | 10/2014 | Park et al. | |
| 2014/0359487 A1 | 12/2014 | Lee | |
| 2015/0271112 A1 | 9/2015 | Liu et al. | |
| 2015/0372951 A1 | 12/2015 | MacDonald | |

FOREIGN PATENT DOCUMENTS

| | | |
|---|---|---|
| JP | 2014-071616 A | 4/2014 |
| JP | 2014-096097 A | 5/2014 |
| KR | 20140120050 A | 10/2014 |
| KR | 20140142579 A | 12/2014 |
| KR | 2015-0108324 A | 9/2015 |

OTHER PUBLICATIONS

Japanese Office Action for 2016-041463 dated Oct. 3, 2017.
International Search Report for PCT/JP2017/008501 dated May 23, 2017.
Office Action dated Mar. 31, 2019, issued in correspondin Japanese Patent Application No. 2018-112857.
Office Action dated Sep. 15, 2020, issued in corresponding Japanese Patent Application No. 2019-191217.
Office Action for corresponding Chinese Patent Application No. 201780013591.8 dated May 22, 2020 and English translation thereof.
Office Action for corresponding Chinese Patent Application No. 201780013591.8 dated May 22, 2020.
Office Action dated Jul. 6, 2021, corresponding to Japanese Patent Application No. 2019-191217 and its English translation.

* cited by examiner

FIG.11

| GROUP IDENTIFIER | GROUP NAME | GROUP ATTRIBUTE | RELATED GROUP IDENTIFIER | USER NAMES |
|---|---|---|---|---|
| 001 | FRIEND 1 | NORMAL | | USER A<br>USER B<br>USER C<br>USER D |
| 002 | FRIEND 2 | SUBGROUP | 001 | USER A<br>USER B |
| 003 | OFFICE 1 | NORMAL | | USER A<br>USER E<br>USER F<br>USER G |
| 004 | OFFICE 2 | NORMAL | 003 | USER A<br>USER G |

GROUP IDENTIFIER: 001

262

| TRANSMISSION/ RECEPTION TIME | USER AS SENDER | CONTENT | CONTENT IDENTIFIER | READ STATE |
|---|---|---|---|---|
| 2016/2/16 10:00 | USER A | MESSAGE | MESSAGE | ALREADY-READ 3 |
| 2016/2/17 11:00 | USER B | ..... | STAMP | ALREADY-READ 1 |
| ... | ... | ... | ... | ... |

DISPLAY CONTROL METHOD, RECORDING MEDIUM STORING PROGRAM, TERMINAL

CROSS-REFERENCE TO RELATED APPLICATIONS

This application is a continuation application of International Application PCT/JP2017/008501 filed on Mar. 3, 2017 and designated the U.S., which is based upon and claims the benefit of priority of Japanese Patent Application No. 2016-041463 filed on Mar. 3, 2016, the entire contents of which are incorporated herein by reference.

FIELD

The present invention relates to a display control method, a recording medium on which a program is recorded, and a terminal.

BACKGROUND

It has been widely practiced on a social network service (SNS) where multiple users form a group to share contents such as messages and stamps between terminals of the users belonging to the group. A server that provides such an SNS receives a command from a terminal of a user and generates a new group in accordance with usage of the user.

It has also been widely practiced that a user belongs to multiple groups to transmit and receive contents addressed to different groups at the same time by using a terminal of the user. In addition, a display control method has also been proposed to be used in such a case (see, for example, Japanese Unexamined Patent Application Publication No. 2014-96097).

However, according to the conventional method, although a terminal of a user can transmit and receive contents addressed to multiple groups at the same time, it is not possible to take over contents and the like transmitted and received within a first group to a second group.

In the case where users belonging to the first group overlap users belonging to the second group, when contents and the like are transmitted and received within the second group, it is desirable that contents and the like transmitted and received within the first group are displayed on the screen of a terminal in association with the contents and the like within the second group.

SUMMARY

According to an aspect, a display control method is provided on a terminal of a user belonging to a group to transmit and receive a content with a terminal of another user belonging to the group via an information processing apparatus. The display control method includes a first step of displaying on a screen, in response to receiving from the user a selection of a part of users belonging to the group, a content having the part of the users as a sender in a displaying aspect different from a displaying aspect of other contents; a second step of transmitting to the information processing apparatus, in response to receiving a command from the user, a request for activating an individual process of individually transmitting and receiving the content with a terminal of the part of the users; and a third step of executing the individual process in response to receiving a response indicating that the individual process has been activated.

BRIEF DESCRIPTION OF DRAWINGS

FIG. 11 is a diagram illustrating an example of a group management table according to the first embodiment;

FIG. 12 is a diagram illustrating an example of a content management table according to the first embodiment;

DESCRIPTION OF EMBODIMENTS

In the following, embodiments will be described with reference to the drawings.

According to an embodiment, it is possible to enable a terminal, when sending and receiving contents among terminals of a part of users belonging to the same group, to display the contents properly associated with states of the group.

First Embodiment

<System Configuration>

Figure 1:
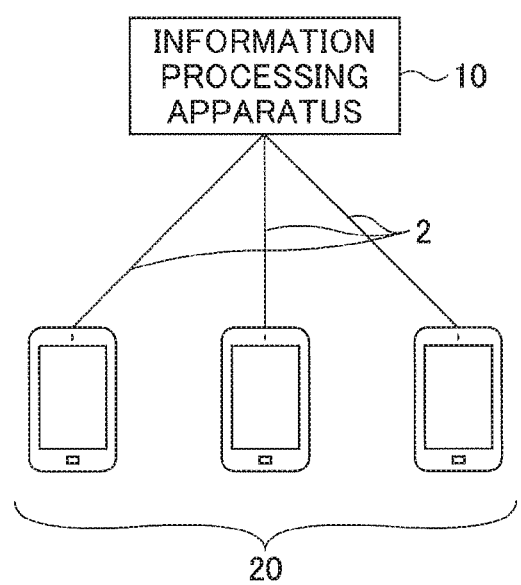
FIG. 1 is a diagram illustrating an example of a system configuration according to a first embodiment.

FIG. 1 is a diagram illustrating a system configuration of an information processing system 1 according to the first embodiment. The information processing system 1 includes an information processing apparatus 10 and terminals 20. The information processing apparatus 10 and the terminals 20 are connected via a network 2. The network 2 includes a wired network and a wireless network.

The information processing apparatus 10 is realized by, for example, a server. The terminal 20 is a smartphone, a tablet terminal, a PC (Personal Computer), a mobile phone, a game console, a touch pad, an electronic book reader, a wearable terminal, or the like.

The information processing apparatus 10 provides an SNS (Social Network Service) to the user of the terminal 20.

As one of the services of the SNS, the information processing apparatus 10 provides a chat service for transmitting and receiving contents such as messages, stamps, still images, and moving images among the terminals 20.

The information processing apparatus 10 receives a request for generating a group on the chat service from the terminal 20, to generate a group. The information processing apparatus 10 manages groups of the chat service to which the users belong. In response to receiving from a terminal 20 a content addressed to a group, the information processing apparatus 10 transmits the content to terminals 20 of the users belonging to the group.

The information processing apparatus 10 receives from a terminal 20 a request for generating a new group to which a part of the users of an existing group will belong, to generate a new group. The new group will take over a part of states of the existing group. Details will be described later.

The terminal 20 has an SNS application installed to receive the SNS provided by the information processing apparatus 10. The terminal 20 transmits and receives contents with the other terminals 20 via the information processing apparatus 10.

The terminal 20 transmits a content to the information processing apparatus 10 setting the user of the terminal 20 as the sender. Also, the terminal 20 receives contents from the other terminals 20 from the information processing apparatus 10. The terminal 20 displays a received content on the screen of the terminal 20.

The terminal 20 receives a command to generate a group from the user. A command to generate a group includes information that identifies users who may belong to the group. In response to receiving a command to generate a group, the terminal 20 transmits a request for generating the group to the information processing apparatus 10. The terminal 20 also receives from the user a command to generate a new group to which a part of the users of an existing group may belong, and transmits a request for generating the new group to the information processing apparatus 10.

<Operation Sequence>

(1) Generation of Subgroup

By using FIG. 2, an operation sequence related to generation of a subgroup will be described.

Figure 2:
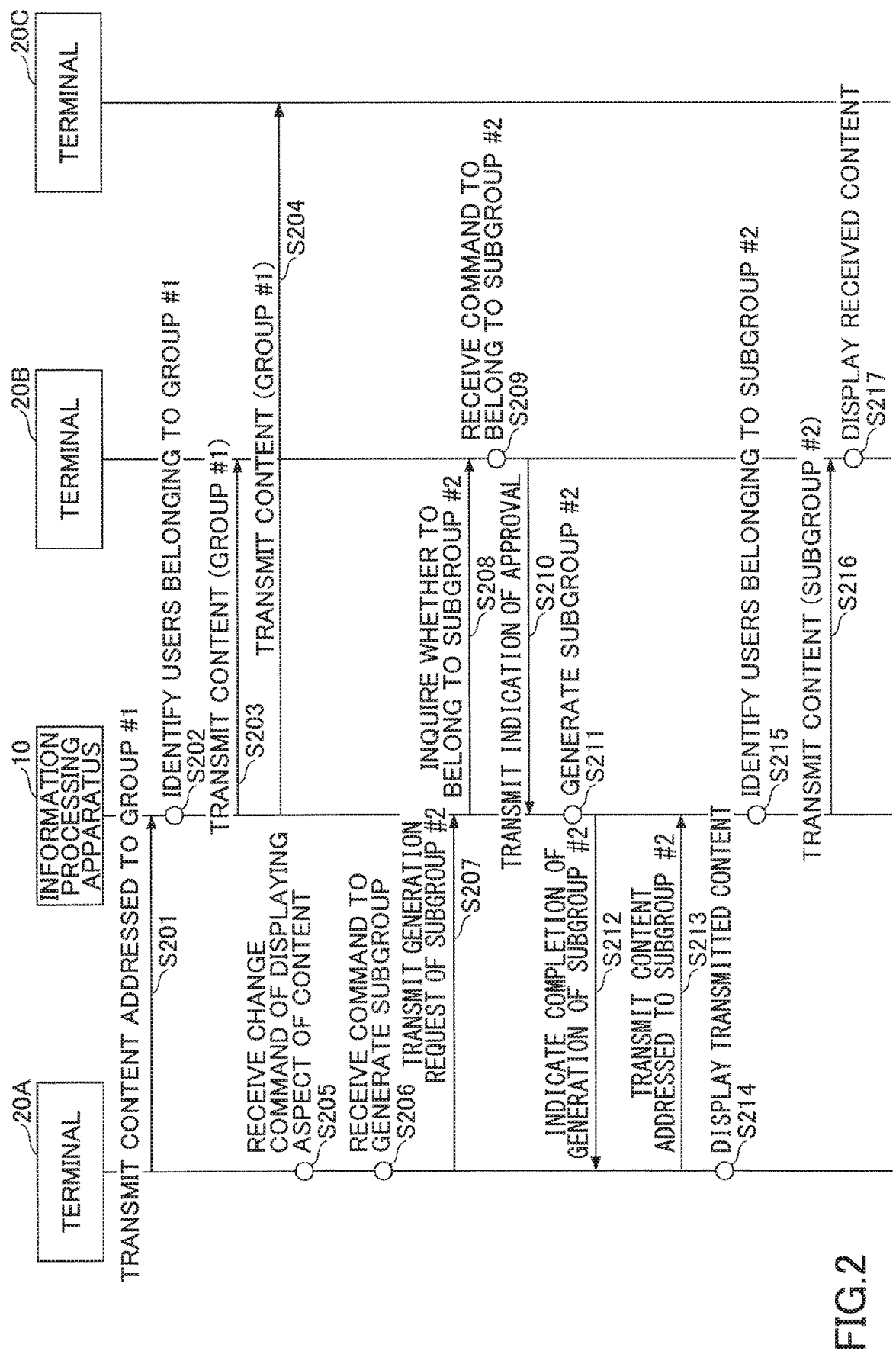
FIG. 2 is a first diagram illustrating an example of an operation sequence according to the first embodiment.

FIG. 2 illustrates an operation sequence in which contents are transmitted and received among a terminal 20A of a user A, a terminal 20B of a user B, and a terminal 20C of a user C. Here, assume that the user A, the user B, and the user C belong to a group #1, which is the same chat service group.

At Step S201, the terminal 20A transmits a content addressed to the group #1 to the information processing apparatus 10.

At Step S202, the information processing apparatus 10 identifies users belonging to the group #1. In addition to the user A, the information processing apparatus 10 identifies that the user B and the user C belong to the group #1.

At Step S203, the information processing apparatus 10 transmits the content to the terminal 20B of the user B.

At Step S204, the information processing apparatus 10 similarly transmits the content to the terminal 20C of the user C.

At Step S205, the terminal 20A receives, from the user A, a selection of other users to belong to the group #1 and a command to change the displaying aspect of the content. The terminal 20A changes the displaying aspect of contents whose sender is one of the other users selected in response to receiving the command from the user A, and displays the contents on the screen. For example, in the case of receiving a selection of the user B from the user A, the terminal 20A changes contents whose sender is the user B so as to be easily confirmed by the user A, by changing the displaying aspect of the contents whose sender is the user B and/or the user C. A specific example of a screen display in the case of changing the displaying aspect will be described later.

Next, operational steps for generating a new group will be described, which is initiated by the user A on the terminal 20A, with the user B as a user belonging to the group #1. Here, a newly generated group to which a part of the users belonging to a group will belong is referred to as a "subgroup". The subgroup takes over a part of states of the group as the base of the subgroup.

After the user A has confirmed the displaying aspect of the contents whose sender is one of the other users, when the terminal 20A receives, from the user A, a command to start transmission and reception of contents with a part of the users of the group #1 individually, a process of Steps S206 and thereafter is started.

At Step S206, the terminal 20A receives a command to generate a subgroup from the user A. The command to generate the subgroup includes a selection of users to belong to the subgroup. When generating a subgroup from the group #1, the user A can select the user B or the user C as a user to belong to the subgroup.

The command to generate the subgroup also includes information that identifies the states to take over from the group as the base of the subgroup.

The states to take over include contents that have been transmitted and received within the group as the basis of the subgroup, read states ("not-read" and "already-read") that indicate whether the contents have been read by the other users, and the like. The information that identifies the states to take over includes information that identifies contents to be taken over to the subgroup. The terminal 20 may receive designation of the sender of a content and a period during which contents have been transmitted and received, to identify the contents to be taken over to the subgroup and their read states.

The command to generate a subgroup may also include the name of the subgroup and information that identifies the displaying aspect on a terminal that takes over the contents to be taken over.

Here, assume that the terminal 20A has received, from the user A, a command to select the user B as a user to belong to the subgroup. Assume also that as the states to take over, the terminal 20A has received designation from the user A to set contents that have the user A and the user B as the sender during the last one month, and the read states of the contents. Assume also that the terminal 20A has received the command from the user A in which the name of the subgroup is designated as "subgroup #2". The terminal 20A may set, as the states to take over, only contents and the like that have been set at Step 205 to be displayed in the different displaying aspect so as to be easily confirmed, and have the user B set as the sender.

At Step S207, the terminal 20A transmits a request for generating the subgroup #2. Assume that the generation request includes a user identifier to belong to the subgroup, information that identifies the states to take over, and the name of the subgroup.

At Step S208, in response to receiving the request for generating the subgroup #2, the information processing apparatus 10 transmits an inquiry to the terminal 20B of the user B, who has been selected as a user to belong to the subgroup #2, whether or not to belong to the subgroup #2.

At Step S209, the terminal 20B receives a command from the user B willing to belong to the subgroup #2.

At Step S210, the terminal 20B transmits an indication of approval of belonging to the subgroup #2 to the information processing apparatus 10.

At Step S211, the information processing apparatus 10 generates the subgroup #2 to which the user A and the user B belong. The generated subgroup #2 includes the contents having the user A and the user B as the sender during the last one month and the read states of the contents.

At Step S212, the information processing apparatus 10 indicates to the terminal 20A that the generation of the subgroup #2 has been completed.

The generated subgroup #2 includes the contents and the like having the user A and the user B set as the sender during the last one month. Therefore, in the case where the user A activates the chat service and selects the subgroup on the terminal 20A, the contents of the group #1 having the user A and the user B set as the sender are displayed on the screen of the terminal 20A. In the case where the terminal 20A receives from the user a command to change the display period of the contents displayed on the screen A, the contents of the group #1 having the user A and the user B set as the sender during the last one month and their read states can be displayed on the screen. Also, in the case where the user B selects the subgroup #2 on the terminal 20B, the terminal 20B can execute displaying in substantially the same way as the terminal 20A.

At Step S213, the terminal 20A transmits a content to the information processing apparatus 10 addressed to the subgroup #2.

At Step S214, the terminal 20A displays the content transmitted at Step S213 in a display area of the subgroup #2 on the screen of the terminal 20A. Here, the terminal 20A may display the content transmitted at Step S213 as a content following the contents taken over from the group #1. Also, the terminal 20A may display a content received from the terminal 20B as a content following the contents taken over from the group #1.

At Step S215, the information processing apparatus 10 identifies that the users belonging to the subgroup #2 are the user A and the user B.

At Step S216, the information processing apparatus 10 transmits the content from the terminal 20A to the terminal 20B of the user B.

At Step S217, the terminal 20B displays the received content in a display area of the subgroup #2 on the screen of the terminal 20B. Similar to the terminal 20A, the terminal 20B may display the content received at Step S217 as a content following the contents taken over from the group #1.

In the embodiment described above, although a case has been described where two users belong to a subgroup, substantially the same steps can be applied even in the case where three or more users belong to a subgroup.

Also in the embodiment described above, although the information processing apparatus 10 executes a process of taking over contents from a group to a subgroup, the terminal 20 may execute a process of taking over contents specified by the user to the subgroup. This is because there may be a case where a content having a predetermined period elapsed since its transmission may be deleted from the information processing apparatus 10.

(2) Taking Over States to Existing Group

In the embodiment described above, although steps have been described in which in response to a request for generating a subgroup from the terminal 20, the subgroup is generated by the information processing apparatus 10, and the states of the group are taken over to the subgroup, it is also possible that the states of the group are taken over to another group. In the following, operational steps will be described in the case where the states of the group are taken over to another group.

Figure 3A:
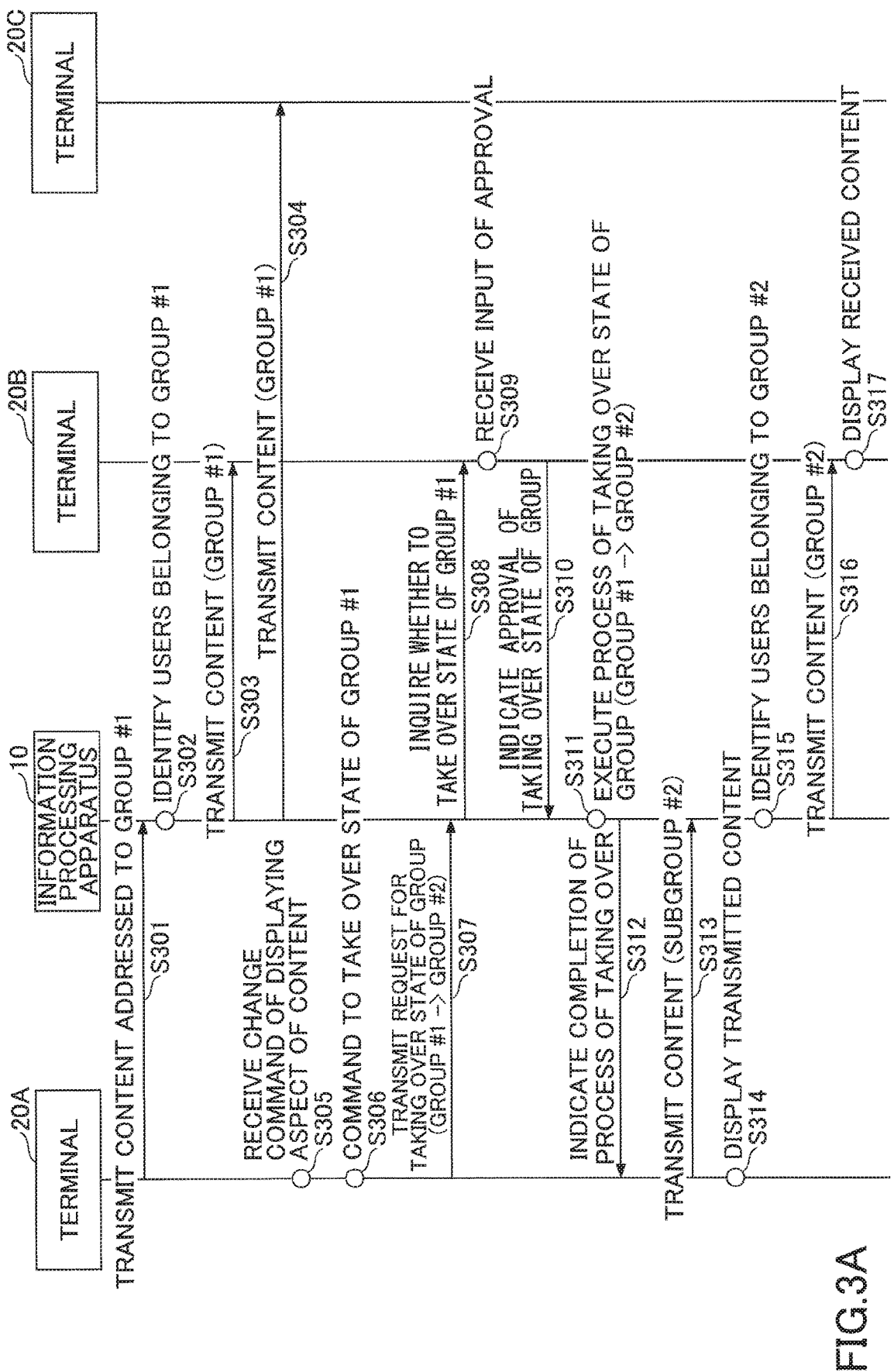
FIG. 3A is a second diagram illustrating an example of an operation sequence according to the first embodiment.

FIG. 3A is a diagram illustrating an operation sequence in the case where states are taken over to an existing group. As in FIG. 2, the operation sequence is illustrated in which contents are transmitted and received among the terminal 20A of the user A, the terminal 20B of the user B, and the terminal 20C of the user C. Here, assume that the user A, the user B, and the user C belong to a group #1 as the same chat service group. Also assume that at the same time, the user A and the user B belong to a group #2 as a group of the chat service.

Since Steps S301 to S305 are substantially the same as Steps S201 to S205, the description is omitted.

At Step S306, the terminal 20A receives, from the user A, a command to take over the states of the group #1 to the group #2.

The command to take over includes information that identifies states to take over from the taken-over group.

The states to take over include contents transmitted and received within the taken-over group, the read states ("not-read" and "already-read") of the contents, and the like. The information that identifies the states to take over includes information that identifies contents to be taken over to the taking-over group. The terminal 20 may receive designation of the sender of a content and a period during which contents have been transmitted and received, to identify the contents to be taken over to the taking-over group and their read states. Further, the command to take over may include a command on the displaying aspect of the taken-over contents in the taking-over group.

Here, assume that as the states to be taken over from the group #1 to the group #2, the terminal 20A has received designation from the user A to set contents that have the user A and the user B as the sender during the last one month, and the read states of the contents. The terminal 20A may set, as the states to take over, only contents and the like that have been set at Step 305 to be displayed in the different displaying aspect so as to be easily confirmed, and have the user B set as the sender.

At Step S307, the terminal 20A transmits a request for taking over the states of the group to the information processing apparatus 10. The request for taking over includes the identifier of the taken-over group, the identifier of the taking-over group, information that identifies the states to take over, and the like.

In other words, the terminal 20A transmits a request for transitioning from the group #1 to the group #2 to the information processing apparatus 10, and the request for transitioning includes information that identifies the states to take over.

At Step S308, in response to receiving the request for taking over the states of the group, the information processing apparatus 10 transmits an inquiry to the terminal 20B of the user B to belong to the taking-over group, whether or not to take over the states of the group #1 to the terminal #2.

At Step S309, the terminal 20B receives as input from the user B to approve taking over the states of the group #1 to the group #2.

At Step S310, the terminal 20B transmits an indication to the information processing apparatus 10 that the takeover of the states of the group has been approved.

At Step S311, the information processing apparatus 10 executes a process of taking over the states of the group #1 to the group #2. As a result of the process, the information processing apparatus 10 manages the contents that have the user A and the user B as the sender during the last one month in the group #1, and the read states of the contents, as the contents and the like in the group #2.

At Step S312, the information processing apparatus 10 indicates to the terminal 20A that the takeover process has been completed.

Once the takeover process has been completed, the group #2 now includes the contents transmitted and received within the group #1. Specifically, the group #2 includes the contents that have the user A and the user B as the sender during the last one month in the group #1.

Therefore, in the case where the user A activates the chat service on the terminal 20A and selects the group #2, the contents and the like taken over from the group #1 are also displayed on the screen of the terminal 20A. Also, in the case where the user B selects the group #2 on the terminal 20B, the terminal 20B can execute displaying in substantially the same way as the terminal 20A. The displaying method will be described later.

At Step S313, the terminal 20A transmits a content addressed to the group #2, to the information processing apparatus 10.

At Step S314, the terminal 20A displays the content transmitted at Step S313 along with the contents taken over from the group #1, in a display area of the group #2 on the screen of the terminal 20A.

At Step S315, the information processing apparatus 10 identifies that the users belonging to the group #2 are the user A and the user B.

At Step S316, the information processing apparatus 10 transmits the content from the terminal 20A to the terminal 20B of the user B.

At Step S317, the terminal 20B displays the received content in a display area of the group #2 on the screen of the terminal 20B. As in the case of the terminal 20A, the terminal 20B may display the content received at Step S317 along with the contents taken over from the group #1.

In the embodiment described above, although the information processing apparatus 10 takes over the contents from the group #1 to the group #2, the terminal 20 may execute a process of taking over contents designated by the user to the group #2. This is because there may be a case where a content having a predetermined period elapsed since its transmission may be deleted from the information processing apparatus 10.

(3) Taking Over States to One-to-one Talk Mode

In the embodiment described above, although a form of taking over states to a group has been described, it is also possible to take over the states to "one-to-one talk mode", which is a mode for transmitting and receiving contents one to one with other users included in the group. In the following, operational steps will be described in the case of taking over states to the one-to-one talk mode.

Figure 3B:
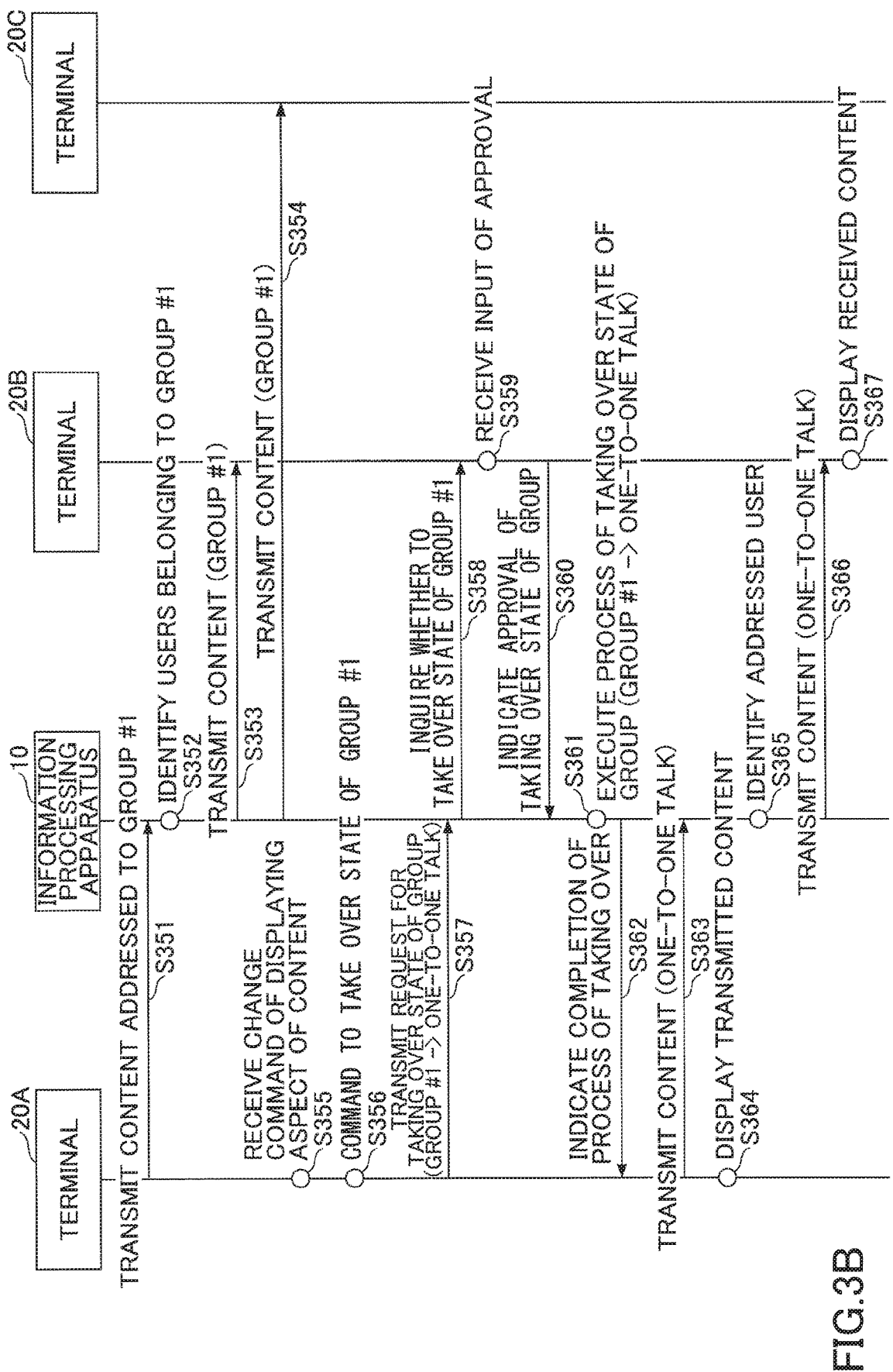
FIG. 3B is a third diagram illustrating an example of an operation sequence according to the first embodiment.

FIG. 3B illustrates an operation sequence in the case of taking over states to the one-to-one talk mode. As in FIG. 3A, the operation sequence is illustrated in which contents are transmitted and received among the terminal 20A of the user A, the terminal 20B of the user B, and the terminal 20C of the user C. Here, assume that the user A, the user B, and the user C belong to the group #1 as the same chat service group.

Since Steps S351 to S355 are the same as Steps S301 to S305, the description is omitted.

At Step S356, the terminal 20A receives, from the user A, a command to take over the states of the group #1 to the one-to-one talk mode between the user A and the user B. The designation of the states to take over is substantially the same as designated at Step S306.

At Step S357, the terminal 20A transmits a request for taking over the states of the group to the one-to-one talk mode, to the information processing apparatus 10. The request for taking over includes the identifier of the taken-over group, the identifier of the user B, information that identifies the states to take over, and the like.

At Step S358, in response to receiving the request for taking over the states of the group, the information processing apparatus 10 transmits an inquiry to the terminal 20B of the user B whether or not to take over the states of the group #1 to the one-to-one talk mode with the user A.

At Step S359, the terminal 20B receives as input from the user B to approve taking over the states of the group #1 to the one-to-one talk mode with the user A.

At Step S360, the terminal 20B transmits an indication to the information processing apparatus 10 that the takeover of the states of the group has been approved.

At Step S361, the information processing apparatus 10 executes a process of taking over the states of the group #1 to the one-to-one talk mode between the user A and the user B. As a result of the process, the information processing apparatus 10 manages the contents that have the user A and the user B as the sender during a designated period in the group #1, and the read states of the contents, as the contents and the like in the one-to-one talk mode between the user A and the user B. Here, assume that contents and the like during the last one month have been taken over.

At Step S362, the information processing apparatus 10 indicates to the terminal 20A that the takeover process has been completed. Once the takeover process has been completed, the taken over states transition into states in the one-to-one talk mode.

Once the takeover process has been completed, the one-to-one talk mode between the user A and the user B now includes the contents transmitted and received within the group #1. Specifically, the one-to-one talk mode includes the contents that have the user A and the user B as the sender during the last one month in the group #1.

Therefore, in the case where the user A activates the chat service on the terminal 20A and selects the one-to-one talk mode with the user B, the contents and the like taken over from the group #1 are also displayed on the screen of the terminal 20A. Also, in the case where the user B selects the one-to-one talk mode with the user A on the terminal 20B, the terminal 20B can execute displaying in substantially the same way as the terminal 20A.

At Step S363, the terminal 20A transmits a content addressed to the user B, to the information processing apparatus 10.

At Step S364, the terminal 20A displays the content transmitted at Step S363 along with the contents taken over from the group #1, in a display area of the one-to-one talk mode with the user B on the screen of the terminal 20A.

At Step S365, the information processing apparatus 10 identifies that the content is addressed to the user B.

At Step S366, the information processing apparatus 10 transmits the content from the terminal 20A to the terminal 20B of the user B.

At Step S367, the terminal 20B displays the received content in a display area of the one-to-one talk mode with the user A on the screen of the terminal 20B. As in the case of the terminal 20A, the terminal 20B may display the content received at Step S367 along with the contents taken over from the group #1.

<Examples of Screen Displays>

(1) Generation of Subgroup

By using FIGS. 4A to 4E and FIG. 5, displays on the screen of the terminal 20A related to the generation of a subgroup will be described.

Figure 4A:
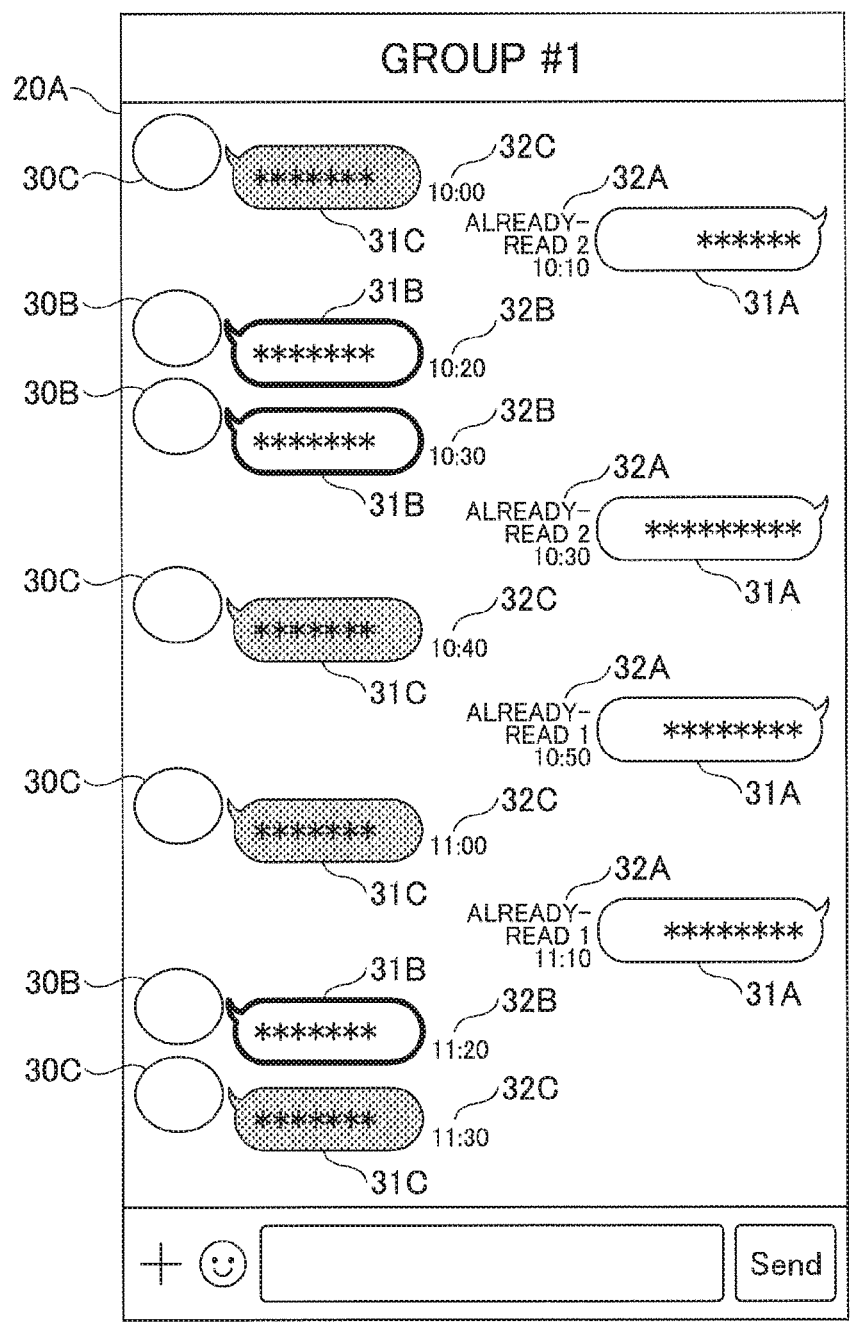
FIG. 4A is a first diagram illustrating an example of a screen display on a terminal according to the first embodiment.

FIG. 4A is a diagram illustrating an example of a display on the screen of the terminal 20A at Step S205. On the left side of the screen, messages 31 (31B/31C) as contents having other users as the senders are displayed together with icons 30 (30B/30C) indicating the other users. Here, the messages 31B displayed together with the icons 30B are messages having the user B as the sender, and the messages 31C displayed together with the icons 30C are messages having the user C as the sender. Also, on the right side of the screen, messages 31A having the user A as the sender are displayed. Each of the messages is displayed together with a state 32 that includes the transmission/reception time of the message, and information representing the read state by the other users (here, a display of "read").

At Step S205, in response to receiving a command from the user A, the terminal 20A changes the displaying aspect of the contents transmitted by the other users. FIG. 4A illustrates an appearance where in response to receiving the command from the user A, the terminal 20A displays the messages 31B from the user B in an emphasizing displaying aspect, and displays the messages 31C from the user C in a grayed out displaying aspect. As a result, the user A can easily confirm the messages from the user B.

In the example in FIG. 4A, although the displaying aspect of the messages 31C from the user C is a gray-out, the messages 31C from the user C may simply not be displayed. Alternatively, in the case where the messages 31C from the user C are grayed out or not displayed, the messages 31B from the user B may be displayed in a normal displaying aspect.

In addition to changing the displaying aspect of the messages 31C from the user C, the terminal 20A may change the display on the screen by setting the displaying aspect of the messages 31A of the user A as grayed out or non-display so that attention is further paid to the messages 31B from the user B.

The terminal 20A may highlight and display the messages 31B so that attention is further paid to the messages 31B from the user B.

In the case where a part of the messages 31A of the user A is not displayed, in order to facilitate confirming whether a response to a message 31B of the user B has been made, the terminal 20A may display a predetermined number of messages 31A of the user A starting from one of the messages 31B on the screen.

FIGS. 4B to 4E and FIGS. 5A and 5B are diagrams illustrating examples of displays on the screen of the terminal 20A at Step S206.

The terminal 20A starts a process of generating a subgroup in response to receiving a predetermined operation from the user A while executing the chat service by using an existing group (group #1).

Figure 4B:
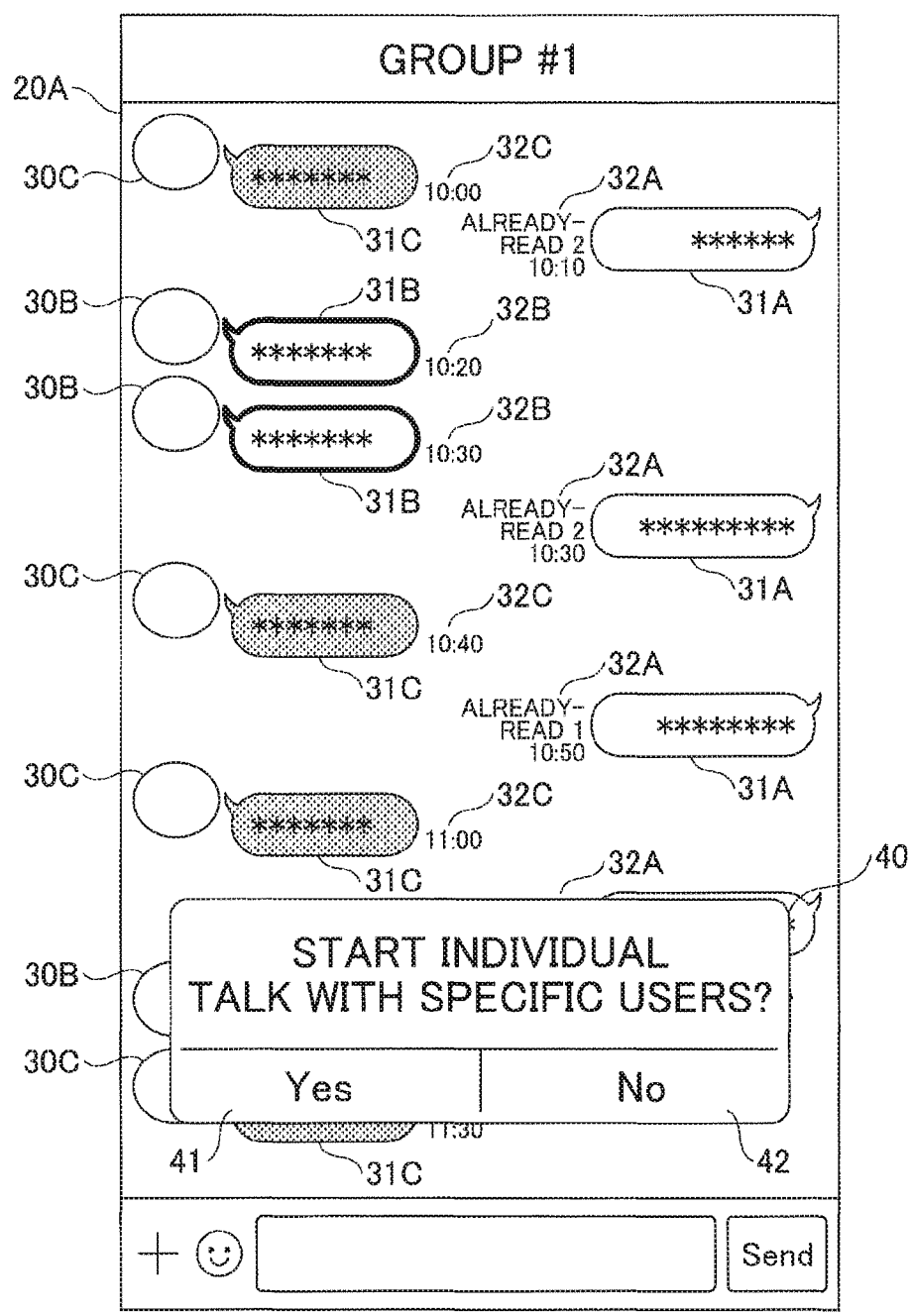
FIG. 4B is a first diagram illustrating an example of a screen display on a terminal according to the first embodiment.
Figure 4C:
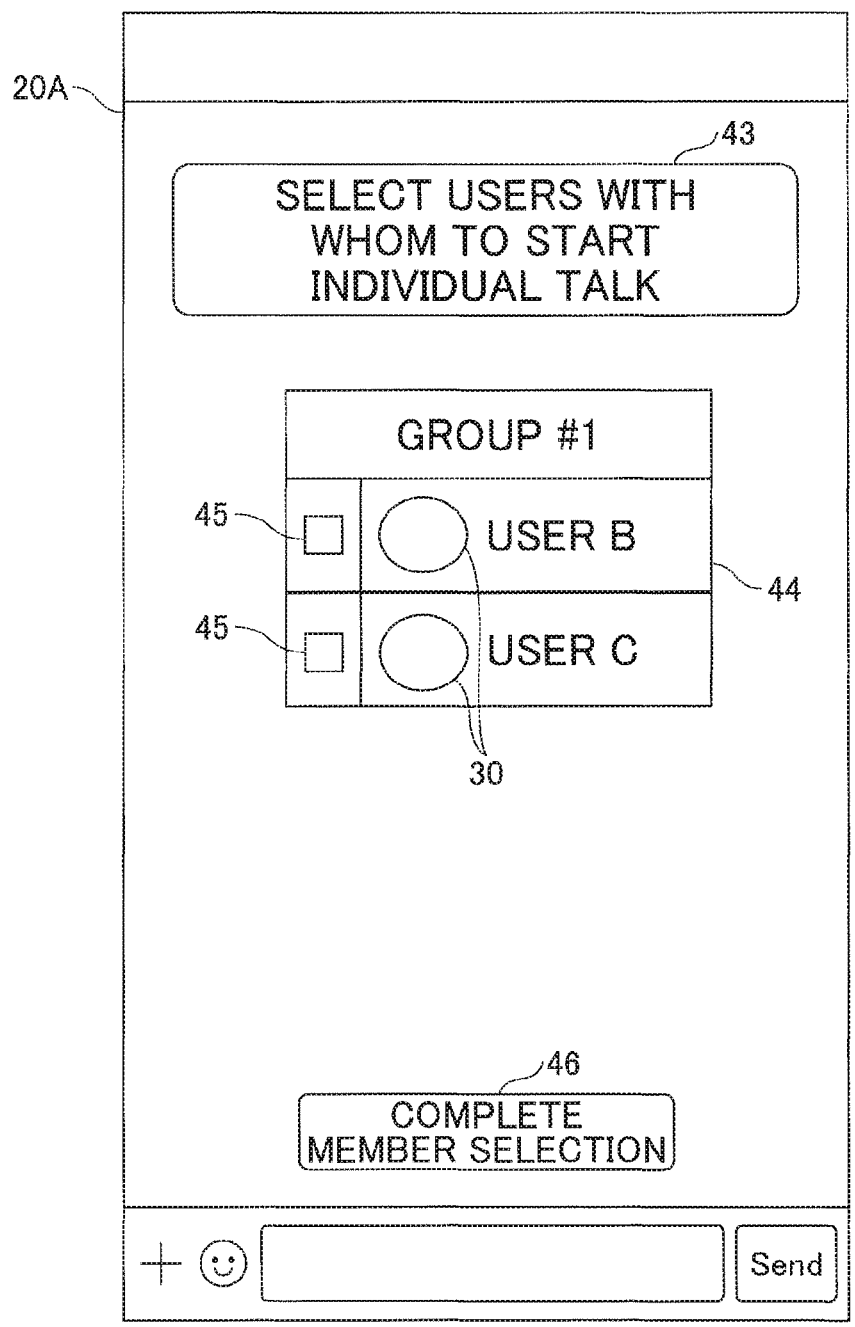
FIG. 4C is a first diagram illustrating an example of a screen display on a terminal according to the first embodiment.

FIG. 4B illustrates a screen when the terminal 20A receives the predetermined operation from the user A while displaying the screen in FIG. 4A. In response to receiving the predetermined operation, the terminal 20A displays on the screen a message of "START INDIVIDUAL TALK WITH SPECIFIC USERS? (40)", which is a message that confirms whether or not the user is willing to generate a subgroup. In the case where Yes 41 has been selected, the terminal 20A displays a screen as illustrated in FIG. 4C. In the case where No 42 has been selected, the process related to generation of the subgroup is terminated.

FIG. 4C is a screen on which the terminal 20A receives, from the user A, a selection of other users to belong to the subgroup. The terminal 20A displays a message of "SELECT USERS WITH WHOM TO START INDIVIDUAL TALK (43)", which prompts a selection of users to belong to the subgroup, together with a list 44 of the users eligible to belong to the subgroup. Since the user A of the terminal 20A is assumed to belong to the group, the terminal 20A displays the user B and the user C who are the other users eligible to belong to the group #1, in a selectable state. If selection fields 45 of the list 44 of the users have been selected, in response to a selection of a button 46 of "COMPLETE MEMBER SELECTION", the terminal 20A displays a screen as illustrated in FIG. 4D.

Figure 4D:
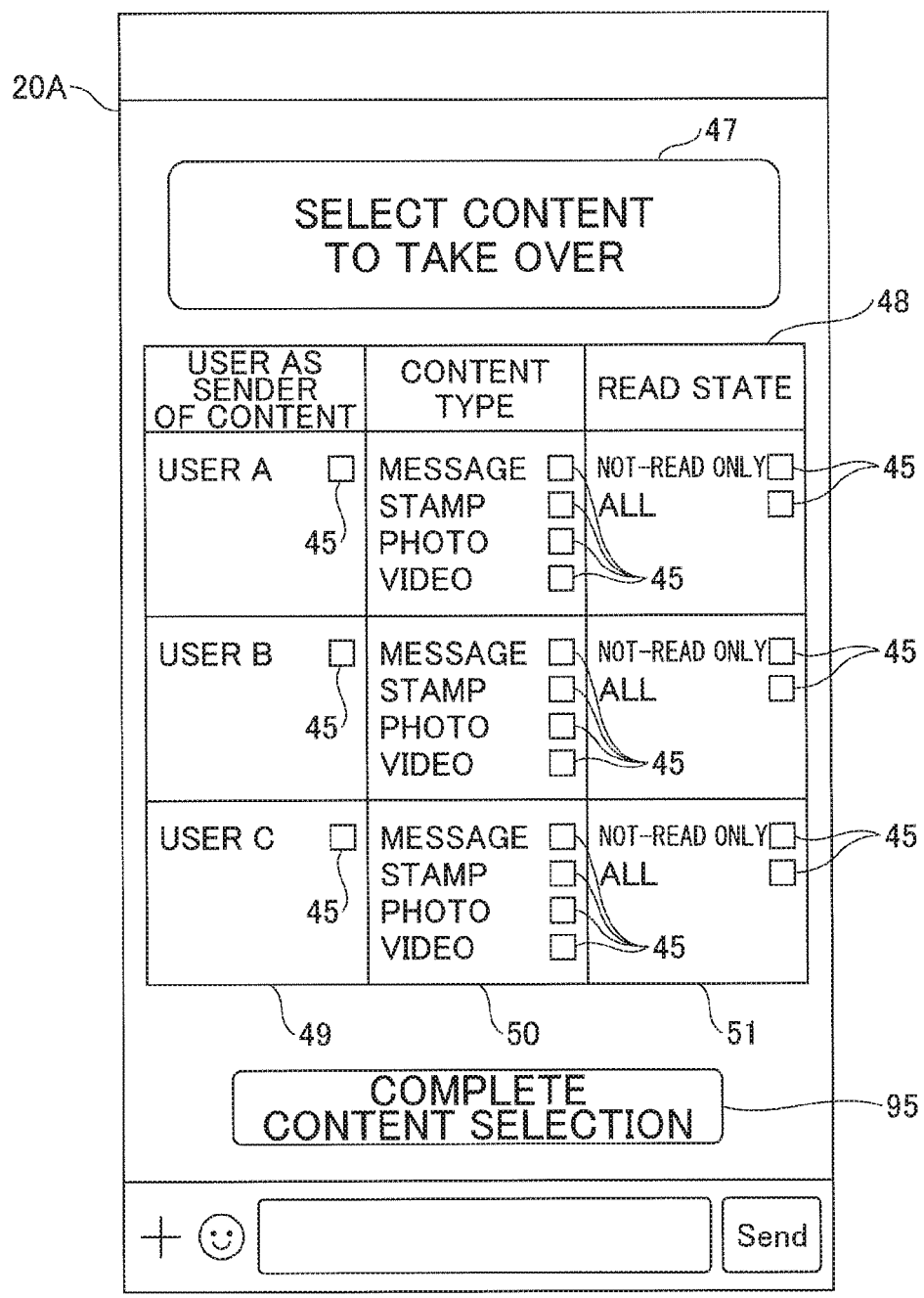
FIG. 4D is a first diagram illustrating an example of a screen display on a terminal according to the first embodiment.

FIG. 4D is a screen on which the terminal 20A receives, from the user A, a selection of contents to be taken over to the subgroup. The terminal 20A displays a message of "SELECT CONTENT TO TAKE OVER (47)" to prompt a selection of contents, together with a content designation table 48. The terminal 20A can receive from the user designation of "USER AS SENDER OF CONTENT (49)", "CONTENT TYPE (50)", "READ STATE (51)", and the like to identify the contents to take over. In the example in FIG. 4C, the user A can designate messages, stamps, photographs, and videos as the content types to take over. In the example in FIG. 4D, the user A can also designate either "not-read only" or "all" as the read state of the contents to take over. In the case where "not-read only" is selected, contents not read by the other users to belong to the subgroup are taken over to the subgroup, among the contents of the selected content types.

In FIG. 4D, although contents can be selected that has any of the users (user A, user B, user C) belonging to the group #1 as the sender, only contents of the users to belong to the newly generated subgroup may be displayed to be selectable. Selecting only the contents of the users to belong to the subgroup, for example, selecting only the contents of the user A and/or the user B has an advantage that it is easier for the user to confirm the contents transmitted and received among the users belonging to the subgroup on the terminal 20 in time series.

By having the user select the content types to take over, the user can select the types of contents to take over in accordance with the usage. For example, in the case where messages are selected as the content type, the user can confirm contents of a discussion in the group before the takeover. Also, for example, in the case where photographs are selected as the content type, the user can collectively confirm photographs that had been transmitted to the group before the takeover.

Figure 4E:
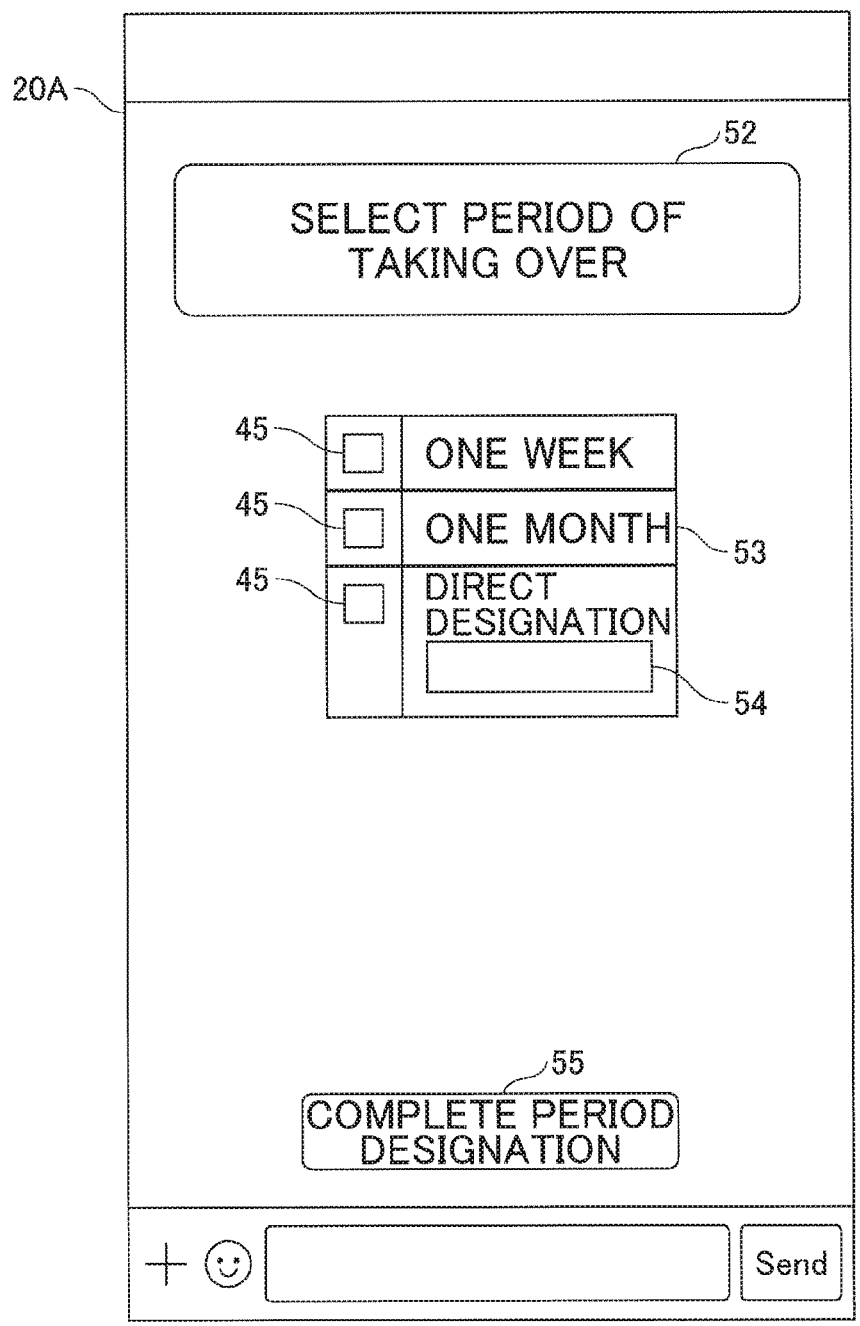
FIG. 4E is a first diagram illustrating an example of a screen display on a terminal according to the first embodiment.

Once the selection fields 45 of the content designation table 48 have been selected, in response to receiving a selection of a button 95 of "COMPLETE CONTENT SELECTION", the terminal 20A displays a screen as illustrated in FIG. 4E.

FIG. 4E is a screen on which the terminal 20A receives from the user A designation of a period of taking over the contents. The terminal 20A displays a message of "SELECT PERIOD OF TAKING OVER (52)", which prompts designation of a period for taking over the contents, together with a period selection table 53.

The period selection table 53 provides selection fields 45 for periods (one week and one month), and a direct designation field 54 of a period. Once a selection of the selection fields 45 of the period selection table 53 or input of a period in the direct designation field 54 has been made, and a selection of a button 55 of "COMPLETE PERIOD DESIGNATION" has been received, the terminal 20A displays a screen as illustrated in FIG. 5A.

Figure 5A:
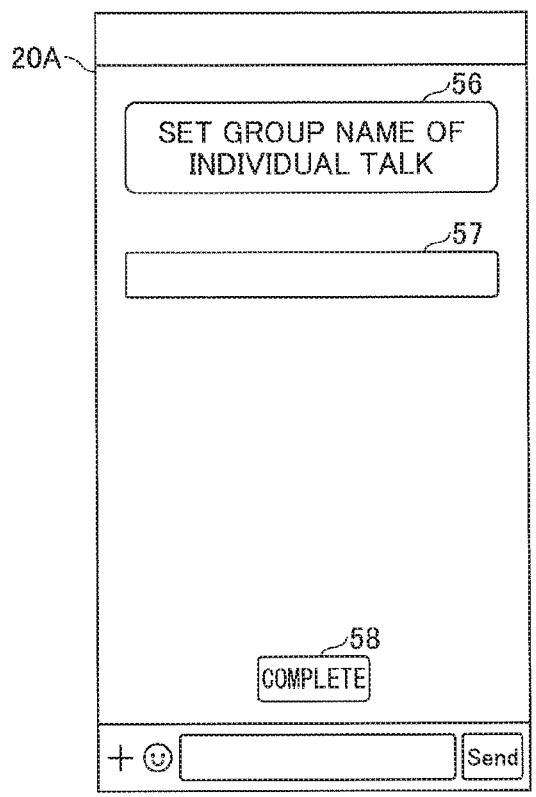
FIGS. 5A-5C include second diagrams illustrating an example of screen displays on a terminal according to the first embodiment.

FIG. 5A is a screen on which the terminal 20A receives, from the user A, a setting of the name of the subgroup. The terminal 20A displays a message of "SET GROUP NAME OF INDIVIDUAL TALK (56)", which prompts a setting of the name of the subgroup, together with a name input field 57.

Figure 5B:
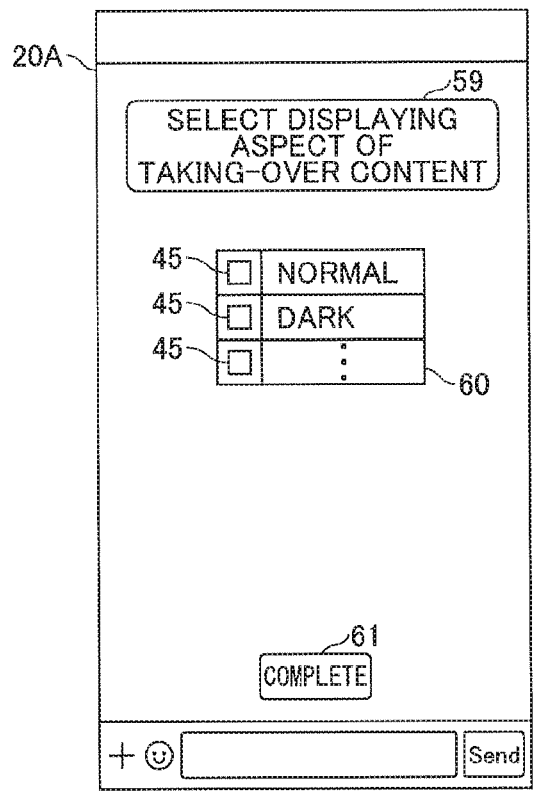

In response to receiving as input the subgroup name, and receiving a selection of a completion button 58, the terminal 20A displays a screen as illustrated in FIG. 5B.

FIG. 5B is a screen on which the terminal 20A receives from the user A designation of the displaying aspect of contents taken over from the group to the subgroup. The terminal 20A displays a message of "SELECT DISPLAYING ASPECT OF TAKING-OVER CONTENT (59)", which prompts determination of the displaying aspect of the contents to take over, together with a displaying aspect selection table 60.

In response to receiving a selection of the displaying aspect of the contents to take over, and receiving a selection of a completion button 61, the terminal 20A transmits a request for generating the subgroup #2 at Step S207, to the information processing apparatus 10.

Figure 5C:
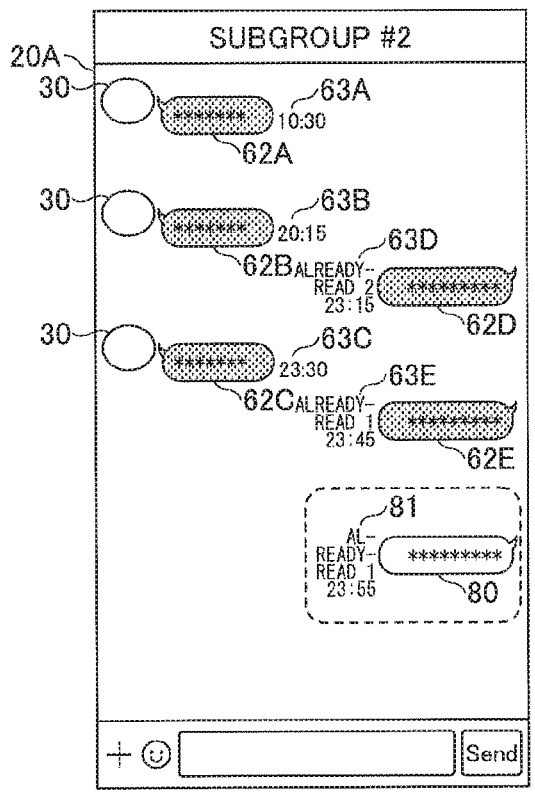

FIG. 5C is a diagram illustrating an example of a display on the screen of the terminal 20A at Step S214. On the screen of the terminal 20A, contents included in the subgroup #2 are displayed together with information representing states of the contents. Here, the information representing the state of a content is the date and time of transmission/reception of the content, and information representing the read state by the other users (here, a display of "already-read").

FIG. 5C illustrates an appearance where contents 62 (62A to 62E) taken over from the group #1 to the subgroup #2 are displayed in a displaying aspect different from a displaying aspect for a content 80 newly generated in the subgroup #2.

Information 63 (63A to 63E) representing the states of the taken-over contents displays the time when the contents in the group #1 have been transmitted and received, and the information representing the read states by the other users.

Information 81 representing the state of the content of the newly generated content 80 presents the time when the newly generated content 80 has been transmitted from the terminal 20A, and the read state by the other users of the subgroup.

(2) Taking Over States to Existing Group

Next, by using FIG. 6 and FIG. 7, displays on the screen of the terminal 20A related to taking over states to an existing group will be described. As for a part common to the displays on the screen for generating a subgroup, refer to FIG. 4A to FIG. 4E and FIG. 5 where appropriate.

At Step S305, in response to receiving a command from the user A, in accordance with the command received from the user A, the terminal 20A changes the displaying aspect of the contents transmitted by the other users in the same way as done at Step S205. The terminal 20A displays a screen, for example, as illustrated in FIG. 4A.

At Step S306, in response to receiving a predetermined operation from the user A while the displaying aspect of the content has been changed and displayed, the terminal 20A starts a process relating to taking over the states to an existing group.

The terminal 20A displays FIG. 4B and FIG. 4C on the screen to prompt the user A to select other users. In the case where an existing group exists between the user A and the other users selected by the user A, the terminal 20A displays a screen as illustrated in FIG. 6A.

Figure 6A:
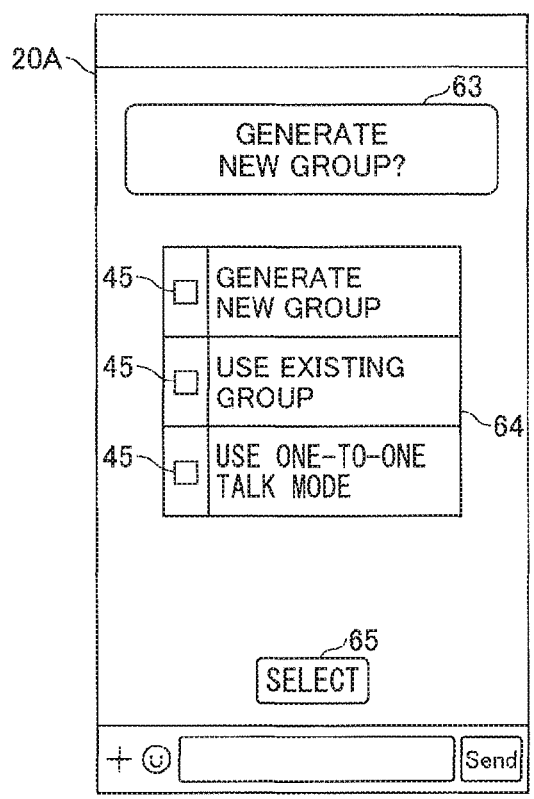
FIGS. 6A-6D include third diagrams illustrating an example of screen displays on a terminal according to the first embodiment.

FIG. 6A is a screen prompting the user A to select whether to generate a new group on the terminal 20A; to use an existing group; or to use the one-to-one talk mode.

The terminal 20A displays a message of "GENERATE NEW GROUP? (63)", which prompts a selection as to whether or not to generate a new group, together with options 64.

In the case where a selection field 45 corresponding to "GENERATE NEW GROUP" has been selected, and a selection button 65 is selected by the user A, the terminal 20A generates a new group. In this case, the terminal 20A starts a process of generating the subgroup.

In the case where a selection field 45 corresponding to "USE EXISTING GROUP" has been selected, and the selection button 65 is selected by the user A, the terminal 20A executes a process of taking over to the existing group. In this case, the terminal 20A displays a screen as illustrated in FIG. 6B.

Alternatively, in the case where a selection field 45 corresponding to "USE ONE-TO-ONE TALK MODE" has been selected, and the selection button 65 is selected by the user A, the terminal 20A displays a screen to execute a process of taking over to the one-to-one talk mode D (as will be described later). The display of "USE ONE-TO-ONE TALK MODE" and the selection fields are displayed in the case where one of the other users is selected.

Figure 6B:
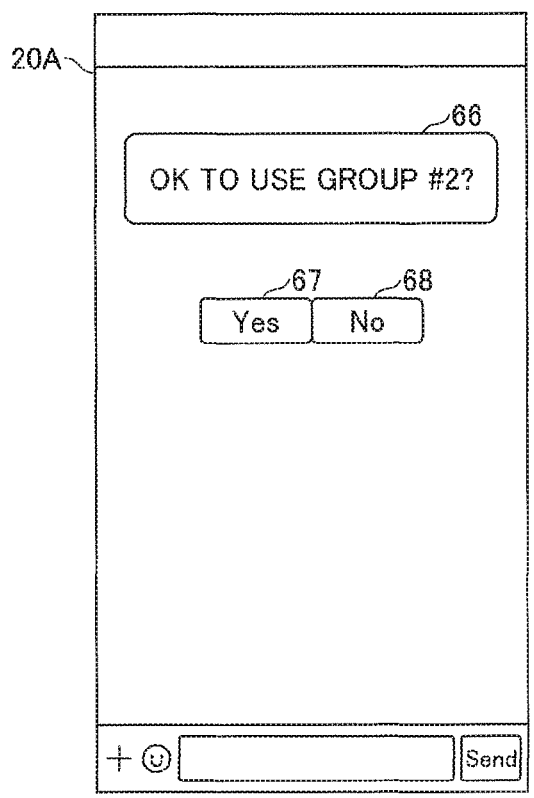
Figure 6C:
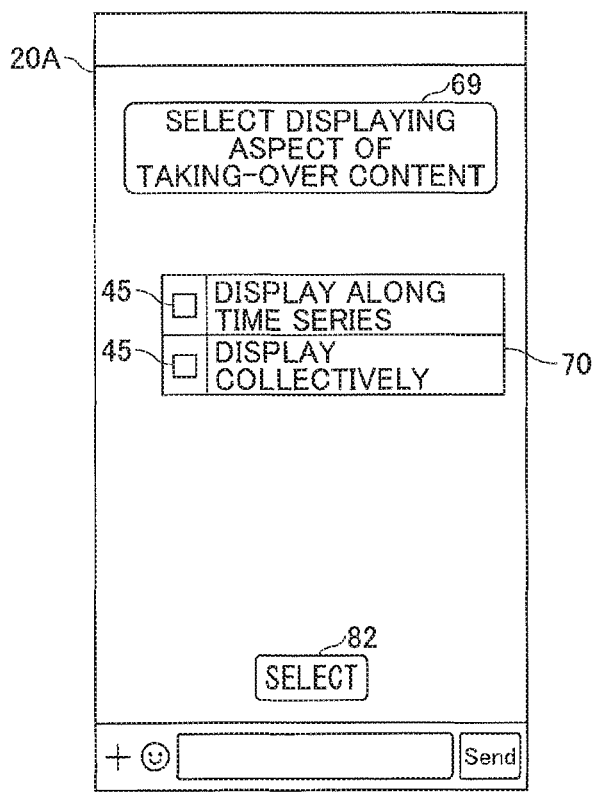

FIG. 6B is a screen for confirming to the user A whether or not the terminal 20A uses an existing group with another selected user. The terminal 20A displays a message of "OK TO USE GROUP #2? (66)" on the screen. In the case where Yes 67 has been selected, the terminal 20A displays a screen as illustrated in FIG. 6C. In the case where No 68 has been selected, the takeover process to the existing group is terminated.

FIG. 6C is a screen on which the terminal 20A prompts the user A to select a displaying aspect of the taken-over contents. The terminal 20 displays a message of "SELECT DISPLAYING ASPECT OF TAKING-OVER CONTENT (69)", to prompt a selection of the displaying aspect of the taking-over contents together with options 70.

Once a selection field 45 corresponding to "DISPLAY ALONG TIME SERIES" or "DISPLAY COLLECTIVELY" has been selected, and the selection button 82 has been selected by the user A, the terminal 20A transmits a request for taking over at Step S307.

Note that the terminal 20A may display the screen to prompt a selection of the displaying aspect of the content in FIG. 5B after having displayed the screen in FIG. 6C, or may display the screen to prompt a selection of the displaying aspect of the content in FIG. 5B before displaying the screen in FIG. 6C.

FIG. 7 include diagrams illustrating an example of displays on the screen when the terminal 20A takes over contents to an existing group.

Figure 7A:
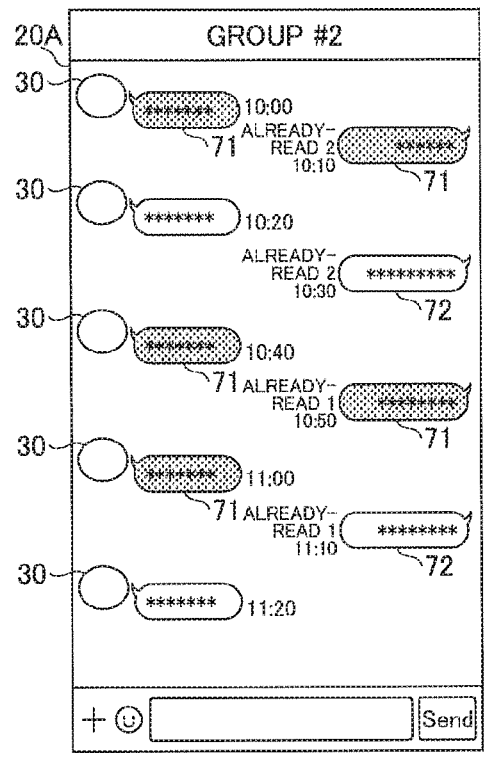
FIGS. 7A-7B include fourth diagrams illustrating an example of screen displays on a terminal according to the first embodiment.

FIG. 7A is a diagram illustrating a display on the screen of the terminal 20A when "DISPLAY ALONG TIME SERIES" has been selected by the user A as the displaying aspect of the contents to take over in FIG. 6C.

Contents 72 transmitted and received within the group #2 as an existing group and contents 71 taken over from the group #1 to the group #2 are displayed in the same time series. Upon receiving a command from the user A, the terminal 20A may display the contents transmitted and received within the group #2 and the contents taken over from the group #1 in respective displaying aspects that can be distinguished from each other. This enables the user A of the terminal 20A to distinguish the contents taken over from the group #1, and at the same time, to confirm the contents transmitted and received among the users in the group #2 along the time series.

Figure 7B:
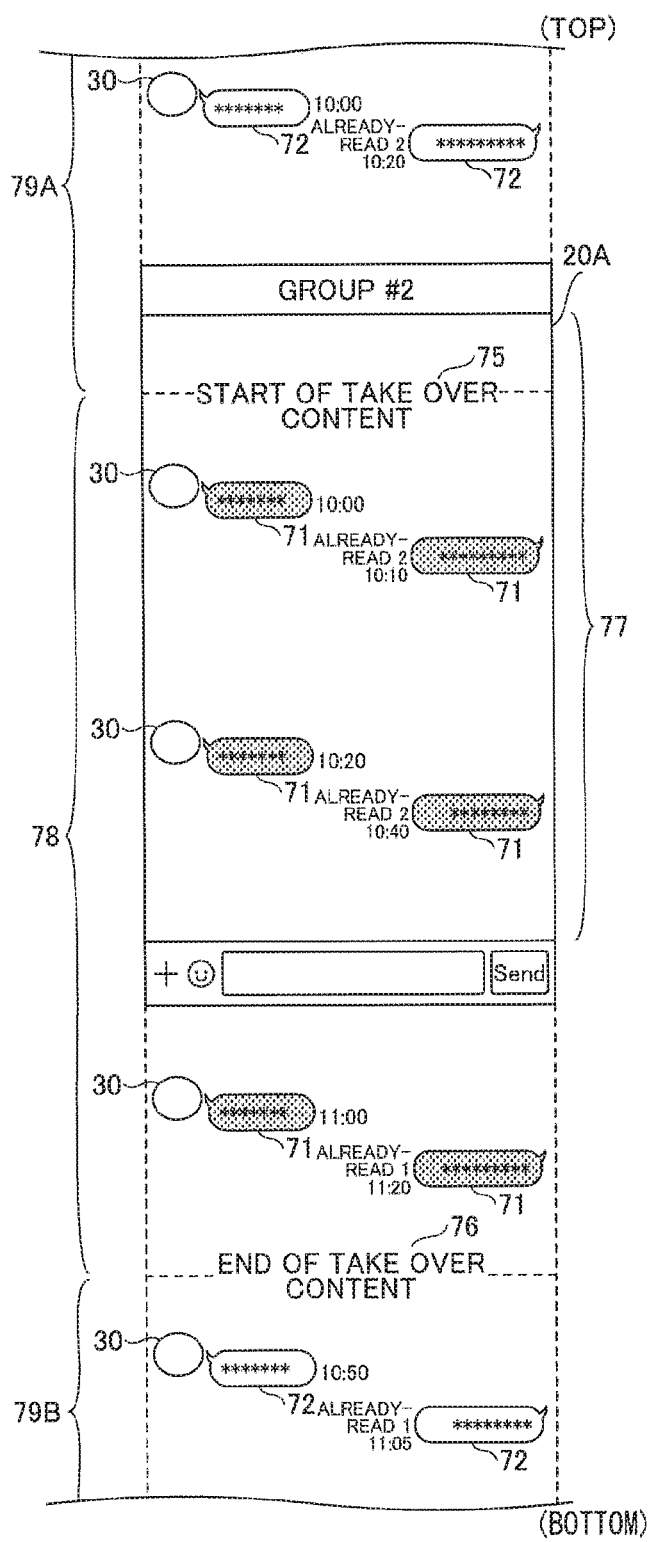

FIG. 7B is a diagram illustrating a display on the screen of the terminal 20A in the case where "DISPLAY COLLECTIVELY" has been selected by the user A as the displaying aspect of the takeover contents in FIG. 6C. Here, contents displayed on the screen of the terminal 20 are the contents existing in a content display area 77. In response to receiving a change command of the display area such as scrolling from the user A on the terminal 20A, the contents displayed in the content display area 77 are changed.

In the case where the takeover contents are displayed collectively, a display area 78 for displaying the contents taken over from the group #1 is provided between display areas 79 (79A and 79B) where existing contents transmitted and received within the group #2 are displayed.

In the example in FIG. 7B, the display area 78 for the takeover contents is provided between the display areas 79A and 79B for the existing contents. The display area 78 for the takeover contents is indicated by a mark 75 of "START OF TAKEOVER CONTENT" and a mark 76 of "END OF TAKEOVER CONTENT". This enables the user A of the terminal 20A to collectively confirm the contents taken over from the group #1.

In FIG. 7B, although the case has been described where the display area 78 for the takeover contents is set between the display areas 79A and 79B for the existing contents, once the takeover process has been completed, the display area 78 for the takeover contents may be provided under the display area 79, namely, at a place where the latest contents are to be displayed.

In the case of taking over to a one-to-one talk, substantially the same display as in FIG. 7 is displayed on the screen of the terminal 20A.

(3) Taking Over States to One-to-one Talk Mode

Next, a screen of the terminal 20A in the case of taking over states to the one-to-one talk mode will be described. Since the display on the screen of the terminal 20A in the case of taking over states to the one-to-one talk mode is almost the same as in the case of taking over states to an existing group, only a different part will be described.

At Step S356, as done at Step S306, the displaying aspects of the contents transmitted by the other users are changed. The terminal 20A displays, for example, a screen as illustrated in FIG. 4A.

At Step S356, in response to receiving a predetermined operation from the user A when the displaying aspect of the content has been changed, the terminal 20A starts a process relating to the takeover of the states to the one-to-one talk mode. When the screen in FIG. 6A is displayed on the terminal 20A, if the selection field 45 corresponding to "USE ONE-TO-ONE TALK MODE" is selected, and then, the selection button 65 is selected by the user A, the terminal 20A displays the screen in FIG. 6D.

Figure 6D:
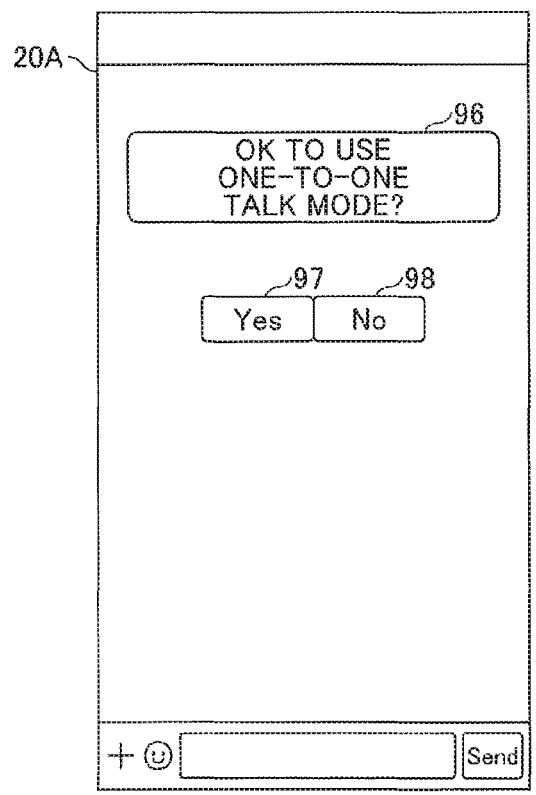

In FIG. 6D, a message of "OK TO USE ONE-TO-ONE TALK MODE? (96)" is displayed to prompt a confirmation whether to start a process of taking over the states to the one-to-one talk mode. In the case where Yes 97 has been selected, the process of taking over the states to the one-to-one talk mode is continued. In the case where No 98 has been selected, the process is terminated.

<Hardware Configuration>

Next, a hardware configuration of each of the devices included in the information processing system 1 will be described.

(1) Information Processing Apparatus

Figure 8:
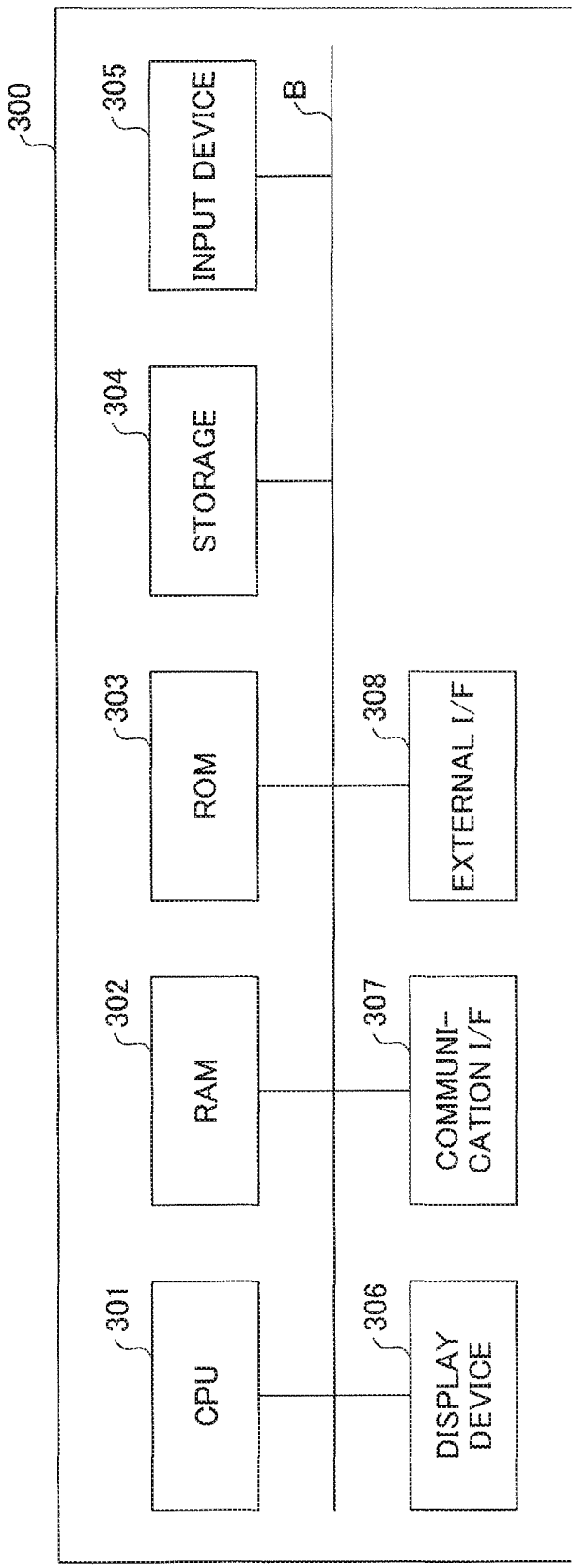
FIG. 8 is a diagram illustrating an example of a hardware configuration of an information processing apparatus according to the first embodiment.

The information processing apparatus 10 has a configuration of a generic computer. FIG. 8 is a diagram illustrating an example of a hardware configuration of a computer according to the first embodiment. In FIG. 8, a computer 300 includes, for example, a CPU (Central Processing Unit) 301, a RAM (Random Access Memory) 302, a ROM (Read-Only Memory) 303, a storage 304, an input device 305, a display device 306, a communication I/F (Interface) 307, and an external I/F 308; and these hardware components are connected with each other via a bus B.

The CPU 301 is an arithmetic device that realizes control and functions of the computer 300 by reading programs and data from a memory such as the ROM 303 and the storage 304 onto the RAM 302 to execute processes. The ROM 303 stores a BIOS (Basic Input/Output System) to be executed when the computer 300 is activated, OS (Operating System) settings, and various settings and the like of programs and data. The RAM 302 is a volatile memory to temporarily hold programs and data. The storage 304 is a mass storage to store programs and data.

The input device 305 is constituted with, for example, a keyboard, a mouse, and the like, to be used by the user to input various operation signals. The display device 306 is, for example, a display or the like, to display a result processed by the computer 300. Note that the input device 305 and/or the display device 306 may be connected to be used when necessary.

The communication I/F 307 is an interface for connecting the computer 300 to the network 2. The external I/F 308 is an interface with an external device. The external device includes an external storage medium 308a and the like. This enables the computer 300 to read and/or write on the external storage medium 308a via the external I/F 308. The external storage medium 308a includes, for example, various optical disks, various memory cards, and the like.

The functions of the information processing apparatus 10 can be realized by the CPU 301 executing programs stored in the ROM 303 and the like.

(2) Terminal

Figure 9:
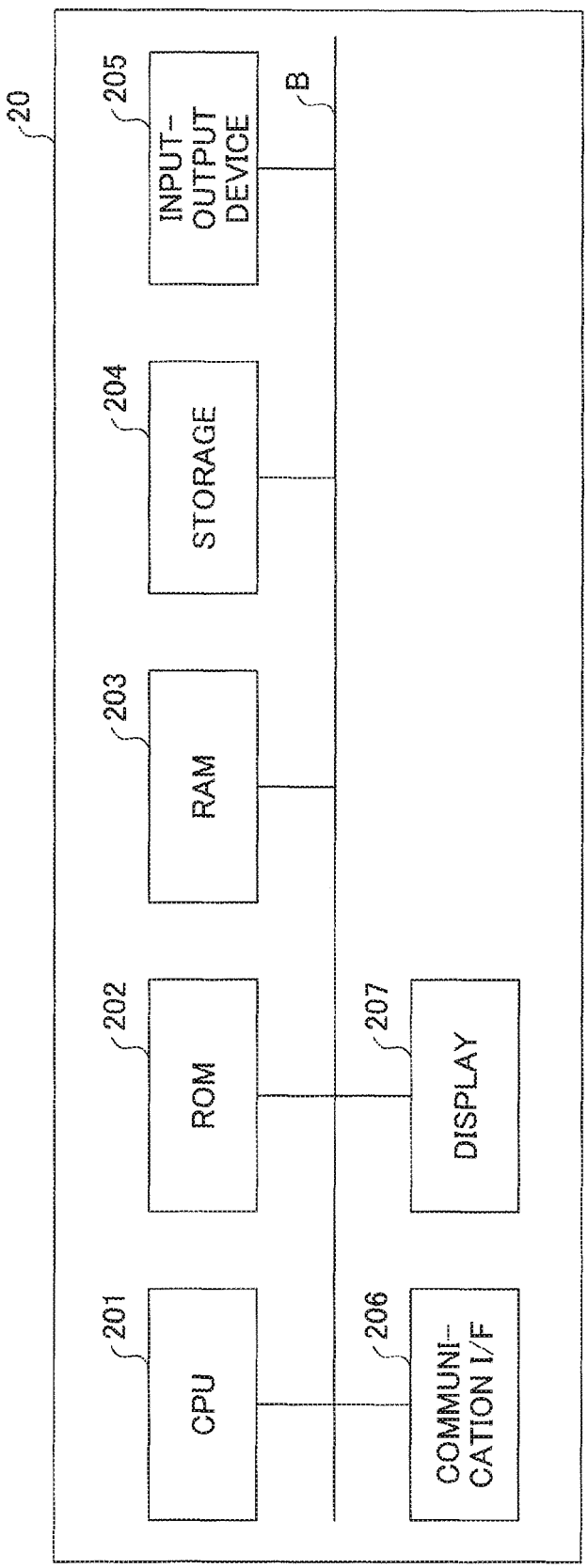
FIG. 9 is a diagram illustrating an example of a hardware configuration of a terminal according to the first embodiment.

FIG. 9 is a diagram illustrating an example of a hardware configuration of the terminal 20 in the first embodiment.

The terminal 20 includes a CPU 201, a ROM 202, a RAM 203, a storage 204, an input/output device 205, a communication I/F 206, and a display 207 (a display device). Note that the hardware components of the terminal 20 are connected with each other via a bus B.

The storage 204 stores various programs. The CPU 201 is a computer that executes various programs stored in the storage 204.

The ROM 202 is a nonvolatile memory. The ROM 202 stores various programs, data, and the like necessary for the CPU 201 to execute various programs stored in the storage 204.

The RAM 203 is a main memory device such as a DRAM (Dynamic Random Access Memory) or an SRAM (Static Random Access Memory). The RAM 203 functions as a work area on which various programs are loaded to be executed by the CPU 201.

The input/output device 205 includes functions of an input device for inputting various commands to the terminal 20 and an output device for outputting processed results processed by the terminal 20. The input/output device 205 is connected to the display 207. In the present embodiment, the display 207 may be a touch-sensitive display (a touch panel). The communication I/F 206 executes communication between the terminal 20 and the information processing apparatus 10 via the network 2.

Functions of the terminal 20 can be implemented by the CPU 201 executing programs stored in the storage 204 or the like.

<Functional Configuration>

(1) Functional Configuration of Terminal

Figure 10:
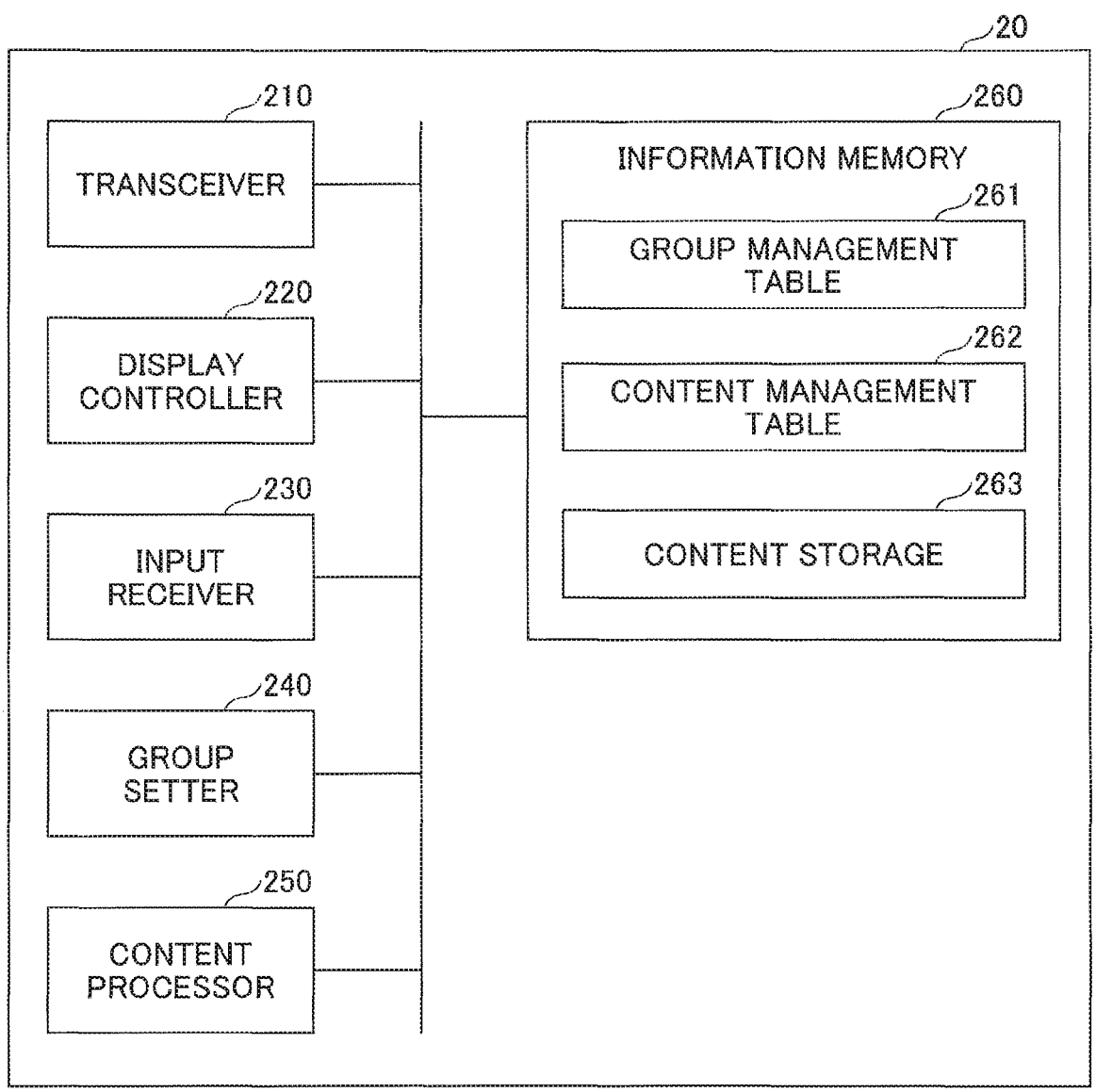
FIG. 10 is a diagram illustrating an example of a functional configuration of a terminal according to the first embodiment.
Figure 13:
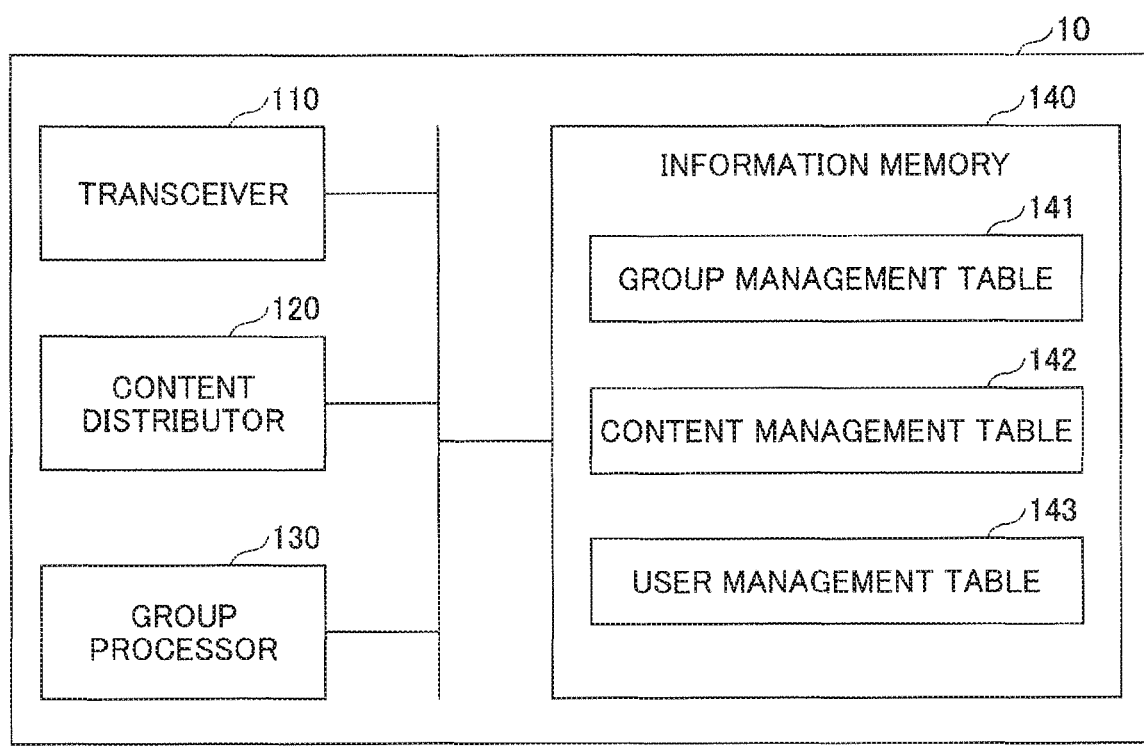
FIG. 13 is a diagram illustrating an example of an information processing apparatus according to the first embodiment.

A functional configuration of the terminal 20 will be described by using FIG. 10. The terminal 20 includes a transceiver 210, a display controller 220, an input receiver 230, a group setter 240, a content processor 250, and an information memory 260. The information memory 260 includes a group management table 261, a content management table 262, and a content storage 263.

The transceiver 210 transmits and receives various data items with the information processing apparatus 10 via the network 2.

The display controller 220 executes display-controlling the screen of the terminal 20 in response to receiving a command from the input receiver 230, the group setter 240, the content processor 250, or the like.

The input receiver 230 receives various commands from the user of the terminal 20.

In response to receiving a command from the user through the input receiver 230, the group setter 240 transmits a request for generating a subgroup and a request for taking over the states to another group, to the information processing apparatus 10.

In response to receiving an indication of completion of a request for generating a subgroup from the information processing apparatus 10, the group setter 240 stores the contents related to the generated subgroup in the group management table 261. In addition, the group setter 240 generates a content management table 262 for the newly generated subgroup. The group setter 240 obtains contents and the like to take over from the content management table 262 of the taken-over group, to set the contents in the content management table 262 for the newly generated subgroup. Note that the contents to take over and the like are identified from information that identifies the states to take over. Information that identifies the states to take over is generated based on input from the user.

Once having received from the information processing apparatus 10 an indication of completion of the request for taking over the states to the other group, the group setter 240 executes a process of taking over the states of the group.

Specifically, the group setter 240 causes the group management table 261 to store a correspondence relationship between the taken-over group and the taking-over group. Also, the group setter 240 obtains the contents and the like to take over from the content management table 262 of the taken-over group and sets them in the content management table 262 of the taking-over group. Note that as done in the generation of a subgroup, the contents to take over and the like are identified from the information that identifies the states to take over.

In response to receiving a command from the user through the input receiver 230, the content processor 250 generates a message and transmits the generated message to the information processing apparatus 10. Also, in response to receiving a command from the user through the input receiver 230, the content processor 250 issues a command to the display controller 220 to display selectable stamps, photographs, and moving images on the screen of the terminal 20. Also, in response to receiving a command related to a selection of stamps and the like from the user through the input receiver 230, the content processor 250 transmits the selected stamps and the like to the information processing apparatus 10. When displaying selectable stamps and the like, the content processor 250 refers to data stored in the content storage 263.

The content processor 250 transmits various contents such as messages and stamps to the information processing apparatus 10 via the transceiver 210. Also, the content processor 250 sets a group or user identifier as the destination of the contents to be transmitted. In the case where a group identifier is set as the destination, the contents are distributed to the terminal 20 of each user belonging to the group having the identifier set.

The information memory 260 stores various items of information. The group management table 261 stores information on the group to which the user of the terminal 20 belongs. An example of the group management table 261 will be described by using FIG. 11. The group management table 261 stores a group identifier that uniquely identifies each group, a group name as the name of the group, a group attribute, a related group identifier, and user identifiers that represent users belonging to the group, which are associated with each other.

The group attribute is set with either of "NORMAL" or "SUBGROUP". The related group identifier is set with the identifier of a group from which states have been taken over. For example, a group having the group identifier of 002 indicates that it is a newly generated subgroup having states taken over from the group having the identifier of 001. For example, a group having the group identifier 004 indicates that an existing group (group identifier 004) having states taken over from a group having the group identifier 003.

The content management table 262 is generated for each of the groups including subgroups. The content management table 262 stores each content that has been transmitted or received and information on the content, which are associated with each other. FIG. 12 illustrates an example of the content management table 262. In FIG. 12, each content transmitted and received in a group having the group identifier 001 and information on the content are associated with each other to be stored. As information on the content, the transmission/reception time, user identifier of the sender, content type, and read state are stored.

The content storage 263 stores contents such as stamps, photographs, and moving images to be transmitted from the terminal 20.

(2) Functional Configuration of Information Processing Apparatus

The information processing apparatus 10 includes a transceiver 110, a content distributor 120, a group processor 130, and an information memory 140. Also, the information memory 140 includes a group management table 141, a content management table 142, and a user management table 143.

The transceiver 110 transmits and receives various items of data with the terminals 20 via the network 2.

The content distributor 120 transmits a content received from the terminal 20 to the terminal 20 of a destination user. The content distributor 120 refers to the user management table 143 to identify the address of the terminal 20 of the destination user, to distribute the content. In the case where a group is set as the destination of the content, the content distributor 120 refers to the group management table 141 to identify users belonging to the group, and refers to the user management table 143 to identify the address of the terminal 20 of each of the destination users.

The group processor 130 receives a request for generating a subgroup from the terminal 20 and transmits a message inquiring whether or not to belong to the subgroup to the terminals 20 of the other users belonging to the group. Note that the generation request includes user identifiers to belong to the subgroup.

In the case where the transceiver 110 has received an indication of approval of belonging to the subgroup from the terminals 20 of the other users, the group processor 130 executes a process of generating the subgroup. Specifically, the group processor 130 generates a group management table 141 for the subgroup. The group processor 130 also generates a content management table 142 for the subgroup. The group processor 130 obtains the contents and the like to take over from the content management table 142 of the group as the source of generation, and sets them in the content management table 142 of the newly generated subgroup. Note that the content or the like to take over is identified from information that identifies states to take over included in the request for generating the subgroup.

The process of generating the subgroup is executed for each of the users to belong to the subgroup, to generate the group management table 141 and the content management table 142.

The group processor 130 receives from the terminal 20 a request for taking over the states of the group to another group, and transmits a message inquiring whether or not to approve the takeover of the states of the group, to the terminals 20 of the other users eligible to belong to the taking-over group. Note that the request for taking over includes the identifier of the taken-over group and the identifier of the taking-over group.

In the case where the transceiver 110 has received an indication of approval of the takeover of the states of the group to the other group from the terminals 20 of the other users, the group processor 130 executes a process of taking over the states of the group.

Specifically, the group processor 130 causes the group management table 141 to store a correspondence relationship between the taken-over group and the taking-over group. Also, the group processor 130 obtains the contents and the like to take over from the content management table 142 of the taken-over group and sets them in the content management table 142 of the taking-over group. As done in the generation of a subgroup, the contents and the like to take over are identified from information that identifies the states to take over included in the request for taking over.

The process of taking over the states of the group is executed for each of the users to belong to the subgroup, to generate the group management table 141 and the content management table 142.

The group processor 130 also receives a request for taking over the states of a group from the user terminal 20 to the "one-to-one talk mode" with another user, and transmits a message inquiring whether or not to approve the takeover of the states of the group to the terminal 20 of the other user. Note that the request for taking over includes the identifier of the taken-over group and the identifier of the other user. In the case where the transceiver 110 has received an indication of approval of the takeover of the group from the terminal 20 of the other user, the group processor 130 executes a process of taking over the states of the group.

In the case where the transceiver 110 has received an indication of approval of the takeover of the states of the group to the "one-to-one talk mode" from the terminal 20 of the other user, the group processor 130 executes a process of taking over the states of the group. The content of the takeover process is substantially the same as in the takeover process to another group.

The information memory 140 stores various items of information. The information memory 140 stores the group management table 141 related to users stored in the terminals 20, and the content management table 142.

The group management table 141 stores the same contents as the group management table 261 of the terminal 20. The content management table 142 stores the same contents as the content management table 262 of the terminal 20.

The user management table 143 stores each user of the SNS that is associated with the address of the terminal 20 of the user.

<Operation Flow>

Figure 14:
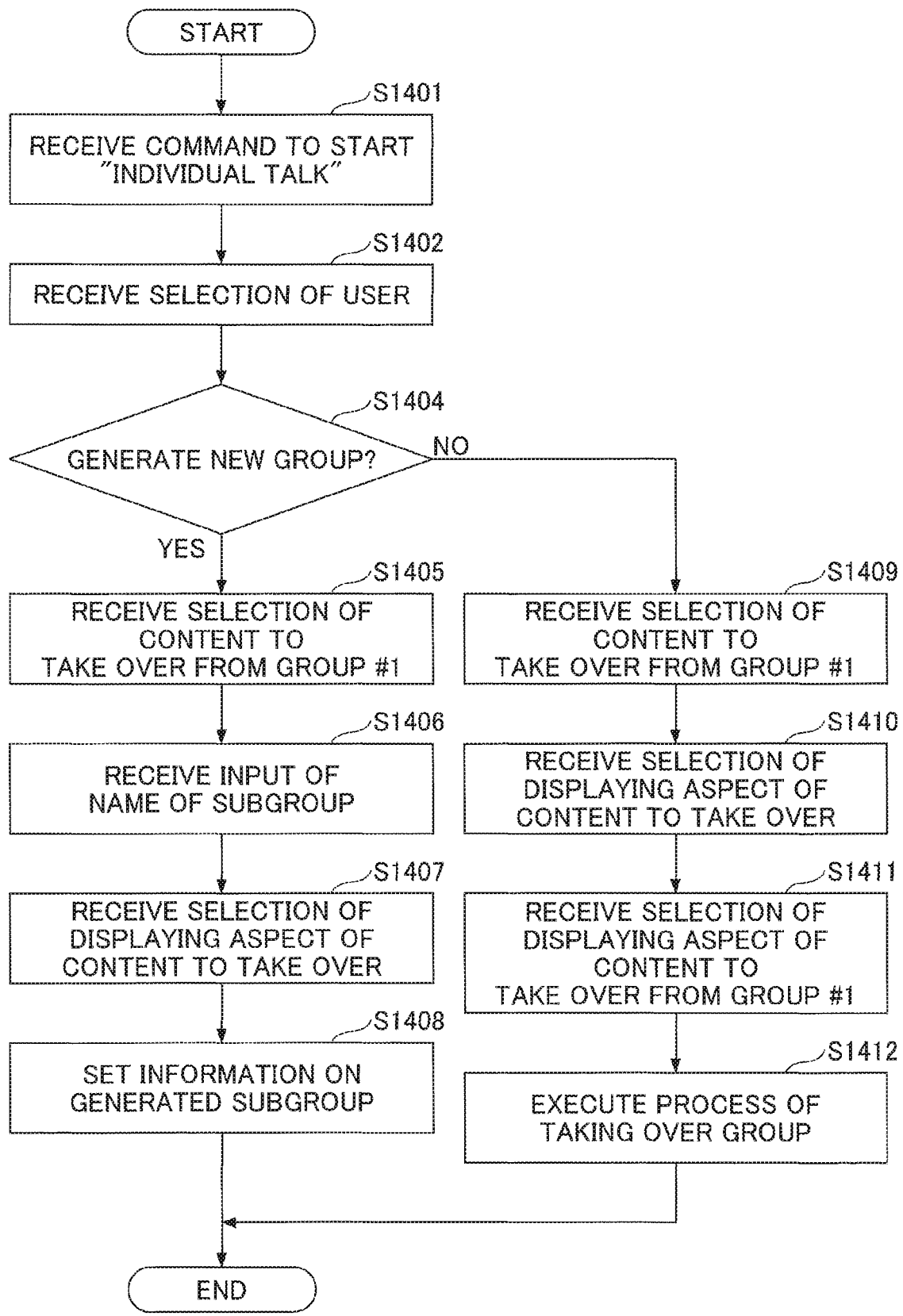
FIG. 14 is a diagram illustrating an example of an operation flow according to the first embodiment.

The operation flow of the terminal 20 according to the first embodiment will be described by using FIG. 14.

At Step S1401, while contents are being transmitted and received within the group #1, the input receiver 230 receives a command to start "individual talk". Here, "individual talk" is to transmit/receive contents among a part of the users included in a group.

At Step S1402, the display controller 220 displays the users belonging to the group #1 on the screen of the terminal 20 in a selectable state. The input receiver 230 receives a selection of users with whom the individual talk will start.

At Step S1404, the group setter 240 causes the display controller 220 to display a message prompting determination as to whether to generate a new group to start the individual talk, or to use an existing group to start the individual talk. For example, the display controller 220 displays a screen as illustrated in FIG. 6A to prompt the user to make a selection.

The display controller 220 displays a message prompting determination on the screen of the terminal 20. In the case where the input receiver 230 receives a selection to generate a new group (YES at Step S1404), the process proceeds to Step S1405. On the other hand, in the case where the input receiver 230 receives a selection to use an existing group (NO at Step S1404), the process proceeds to Step S1409. Here, in the case of generating a new group, the group setter 240 starts a process of generating a subgroup from the group #1, or in the case of using an existing group, starts a process of taking over the states of the group #1 to another group.

At Step S1405, the group setter 240 causes the display controller 220 to display a message prompting a selection of contents to take over from the group #1. The display controller 220 displays on the screen of the terminal 20 prompting a selection of the contents. For example, the display controller 220 displays screens as illustrated in FIG. 4C and FIG. 4D to prompt the user to select the contents. Upon receiving the selection of the contents, the process proceeds to Step S1406.

At Step S1406, the group setter 240 causes the display controller 220 to display a prompt to input the name of the subgroup. The display controller 220 displays on the screen of the terminal 20 prompting input of the name of the subgroup. For example, the display controller 220 displays a screen as illustrated in FIG. 5A to prompt the user to input the subgroup name. Upon receiving input of the subgroup name, the process proceeds to Step S1407.

At Step S1407, the group setter 240 causes the display controller 220 to display entries to prompt a selection of a displaying aspect of the contents to take over from the group #1. The display controller 220 displays on the screen of the terminal 20 prompting a selection of a displaying aspect of the contents. For example, the display controller 220 displays a screen as illustrated in FIG. 5B to prompt the user to select a displaying aspect. Upon receiving a selection of a displaying aspect, the process proceeds to Step S1408.

At Step S1408, upon receiving an indication from the information processing apparatus 10 that generation of the subgroup has been completed, the group setter 240 sets information on the generated subgroups in the group management table 261 and the content management table 262.

At Step S1409, as done at Step S1405, the group setter 240 causes the display controller 220 to display entries to prompt a selection of contents to take over from group #1. Upon receiving a selection of the content, the process proceeds to Step S1410.

At Step S1410, as done at Step S1407, the group setter 240 causes the display controller 220 to display entries to prompt a selection of a displaying aspect of the contents. Upon receiving a selection of a displaying aspect, the process proceeds to Step S1411.

At Step S1411, the group setter 240 causes the display controller 220 to display entries to prompt a selection of a displaying aspect of the contents to take over from the group #1. For example, the display controller 220 displays a screen as illustrated in FIG. 6C to prompt the user to select a displaying aspect. Upon receiving a selection of a displaying aspect, the process proceeds to Step S1412.

At Step S1412, when the group setter 240 receives an indication from the information processing apparatus 10 that the process of taking over the group has been completed, the group setter 240 executes a process of taking over the group on the group management table 261 and the content management table 262 as done by the information processing apparatus 10.

According to the first embodiment, when contents are transmitted and received between the user A and the user B who are a part of the users belonging to the group #1, it is possible to display the contents properly associated with the states of the group #1. Also, the terminal 20 that can receive a command on the states to take over from the user enables to adjust the contents and the like to take over and to be displayed. For example, taking over only contents transmitted by the user A and/or the user B and their read state, and not taking over contents and the like transmitted by the other users has an advantage in that it is easier to confirm the exchange between the user A and the user B.

Second Embodiment

Next, a second embodiment will be described. Description will be omitted for a part common to the first embodiment, and only a different part will be described.

In the first embodiment, in the case of starting transmission and reception of contents individually among the terminals 20 of a part of the users of a group, transmission and reception of contents were performed in another group. In contrast, in the second embodiment, contents are transmitted and received among the terminals 20 of a part of the users within the same group.

(1) Operation Sequence

Figure 15:
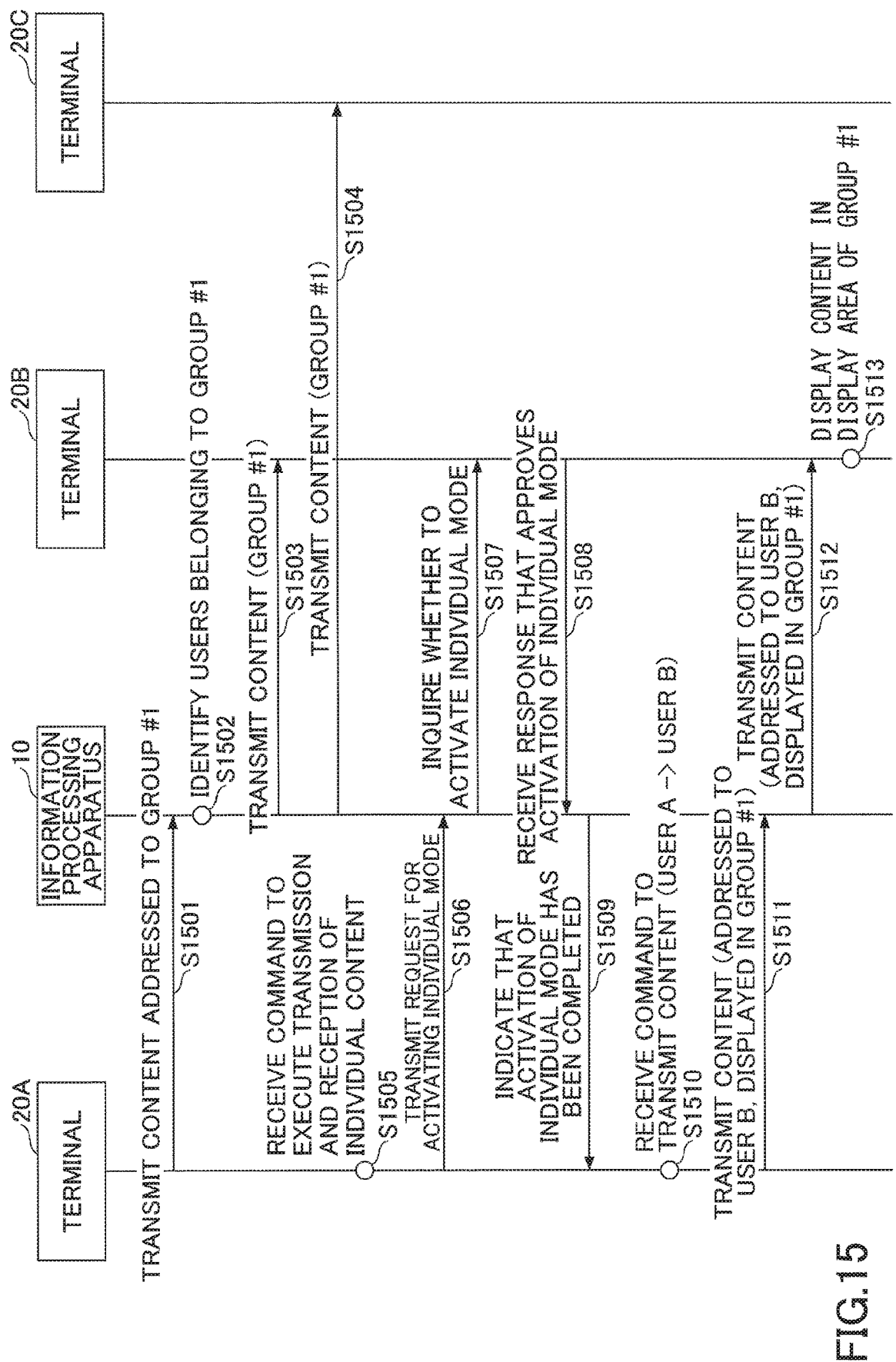
FIG. 15 is a diagram illustrating an example of an operation sequence according to a second embodiment.

By using FIG. 15, an operation sequence according to the second embodiment will be described.

Steps S1501 to S1504 are substantially the same as Steps S201 to S204.

At Step S1505, the terminal 20A receives a command from the user A to execute transmission and reception of contents individually with the user B in the group #1.

At Step S1506, the terminal 20A transmits a request for activating the individual mode to individually transmit and receive contents with the user B in the group #1. The request for activating the individual mode includes a user identifier of a user with whom to individually transmit and receive content.

At Step S1507, the information processing apparatus 10 transmits an inquiry to the terminal 20B of the user B whether or not to activate the individual mode.

At Step S1508, the information processing apparatus 10 receives from the terminal 20B a response that approves the activation of the individual mode.

At Step S1509, the information processing apparatus 10 indicates to the terminal 20A that the activation of the individual mode has been completed.

At Step S1510, the terminal 20A receives, from the user A, a command to transmit a content to the user B.

At Step S1511, the terminal 20A transmits the content to the information processing apparatus 10. Here, the destination of the content is set to the user B instead of the group #1, and the group #1 is set as the display destination of the content.

At Step S1512, the information processing apparatus 10 transmits the content from the terminal 20A to the terminal 20B.

At Step S1513, the terminal 20B displays the received content in the display area of the group #1 on the screen.

Note that the content transmitted and received in the individual mode may be managed by the terminal 20 and the information processing apparatus 10 as a content transmitted and received in the subgroup of the group #1. In this case, the content transmitted and received in the subgroup is displayed in the same display area as the group #1.

(2) Screen Display Example

Figure 16:
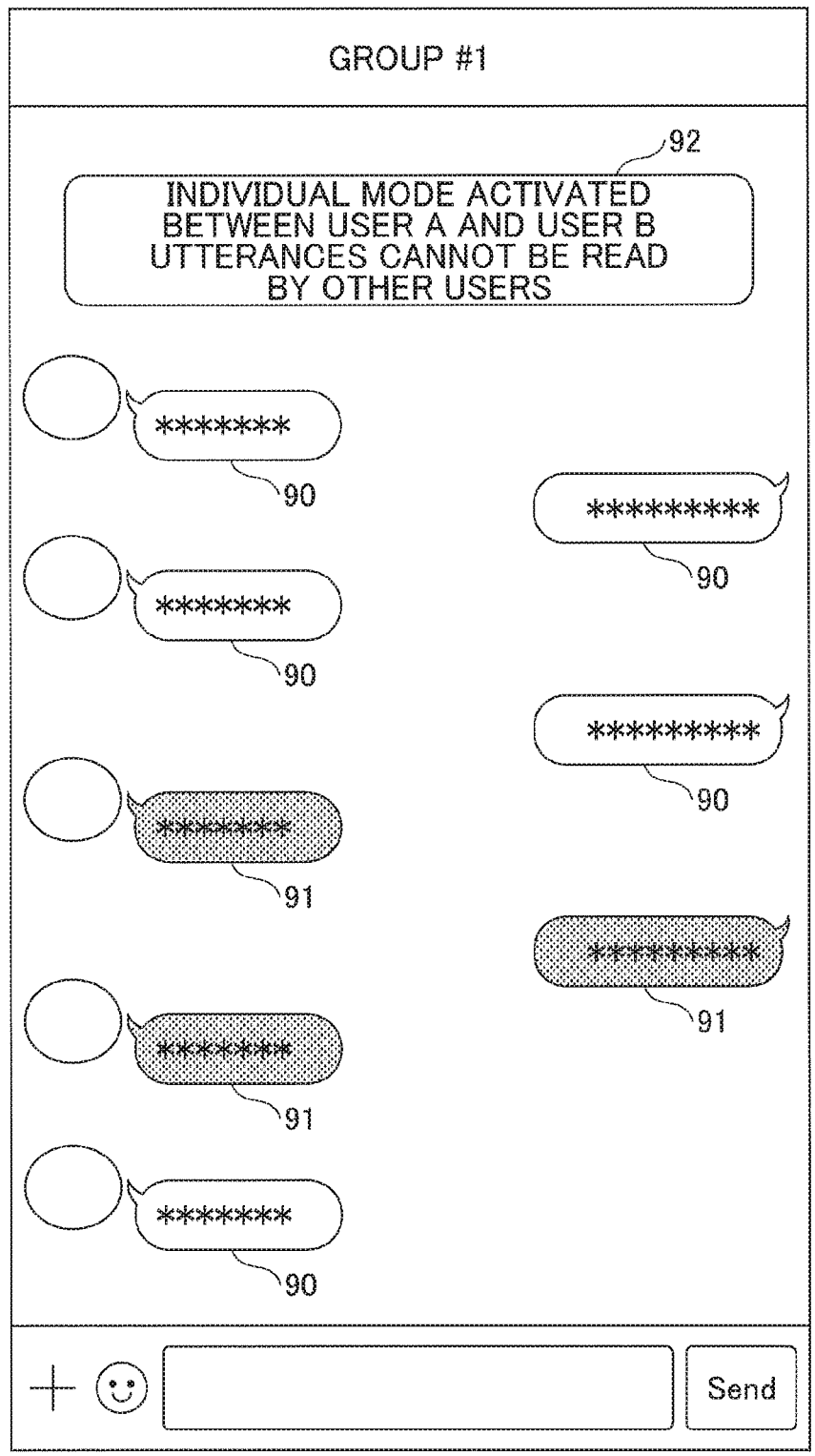
FIG. 16 is a diagram illustrating an example of a screen display on a terminal according to the second embodiment.

FIG. 16 illustrates a display example on the screen of the terminal 20 according to the second embodiment.

Contents 90 transmitted and received within the group and contents 91 transmitted and received in the individual mode are displayed on the screen of the terminal 20 in different displaying aspects.

A message 92 is also displayed to indicate that the individual mode has been activated.

In the individual mode, since contents transmitted and received within the group #1 and contents transmitted and received in the individual mode are displayed in the same display area, but in different displaying aspects, the user of the terminal 20 can confirm the contents without switching between display areas.

According to the second embodiment, when contents are transmitted and received between the user A and the user B who are a part of the users belonging to the group #1, it is possible to display the contents properly associated with the states of the group #1.

Other

A process of generating a subgroup, a process of taking over to an existing group, and a process in the individual mode are examples of an individual process.

A recording medium storing a program code of software that implements functions of an embodiment described above may be supplied to the terminal 20. Furthermore, it is needless to say that an embodiment described above is realized by the terminal 20 that reads the program code stored in the recording medium, and executes the program code. In this case, a program that causes the terminal 20 to execute a display control method described above is stored in the recording medium.

Specifically, a program is stored in a recording medium that causes a terminal of a user belonging to a group, to execute a process of transmitting and receiving a content with a terminal of another user of the group via an information processing apparatus. The process includes a first step of displaying on a screen, in response to receiving from the user a selection of a part of users belonging to the group, a content having the part of the users as a sender in a displaying aspect different from a displaying aspect of other contents; a second step of transmitting to the information processing apparatus, in response to receiving a command from the user, a request for activating an individual process of individually transmitting and receiving the content with a terminal of the part of the users; and a third step of executing the individual process in response to receiving a response indicating that the individual process has been activated.

Furthermore, the program code itself read out of these recording media realizes the functions of the embodiments described earlier.

Also, implementation of the functions of an embodiment described earlier is not limited to execution by a computer device that has read the program code. An operating system (OS) or the like running on the computer device according to instructions of the program code may execute processing partially or entirely. Furthermore, it is needless to say that the functions of the embodiment described earlier may be realized by such processing.

As above, favorable embodiments of the present invention have been described. Note that the present invention is not limited to such embodiments, and various modifications and substitutions can be made without deviating from the scope of the subject matters of the present invention.

The invention claimed is:

1. A display control method for a first terminal of a first user, from among a group of users, to communicate with one or more terminals of one or more other users of the group via an information processing apparatus, the display control method comprising:
    receiving from the first user a selection of a part of users belonging to the group;
    receiving from the first user a selection of a displaying aspect from among a plurality of different displaying aspects;
    first displaying on a screen, using the selected displaying aspect, first content, the first content being content one or more senders of which are users from among the selected part of the users, the selected displaying aspect being different from a displaying aspect of other contents;
    transmitting to the information processing apparatus, based on a command from the first user, a request for activating an individual process of individually transmitting or receiving content with one or more terminals of one or more users included in the selected part of the users;
    executing the individual process based on receiving a response indicating that the individual process has been activated; and
    incorporating a portion of the first content into the individual process, the portion of the first content being provided to the group of users during a period.

2. The display control method as claimed in claim 1, further comprising:
    second displaying both the content transmitted and received in the individual process and the portion of the first content on the screen.

3. The display control method as claimed in claim 2, wherein the portion of the first content includes content transmitted from the first terminal whose sender is the first user, during the period.

4. The display control method as claimed in claim 2, wherein the second displaying displays the portion of the first content and content newly transmitted and received in the individual process in different displaying aspects on the screen.

5. The display control method as claimed in claim 2, wherein the second displaying displays the portion of the first content and content newly transmitted and received in the individual process, in a same time series.

6. The display control method as claimed in claim 2, wherein the second displaying displays the portion of the first content in a first display area, and displays content transmitted and received in the individual process in a second display area different from the first display area.

7. The display control method as claimed in claim 1, wherein the request for activating the individual process is a request for generating a new group to which the first user and the selected part of the users will belong.

8. The display control method as claimed in claim 1, wherein the request for activating the individual process is a request for transitioning to an existing group to which the first user and the selected part of the users belong.

9. The display control method as claimed in claim 1, wherein the request for activating the individual process is a request for executing a process of one-to-one content transmission and reception between the first user and the one or more users of the selected part of the users.

10. The display control method as claimed in claim 1, further comprising:
    setting the selected part of the users as a transmission destination of second content; and
    setting a display area of the group as a display destination of the second content.

11. The display control method as claimed in claim 1, wherein the portion of the first content includes a respective read state of each of a plurality of messages included in the first content.

12. The display control method as claimed in claim 1, wherein the portion of the first content includes a plurality of messages of a selected message type.

13. A non-transitory computer-readable recording medium having program instructions stored therein for causing a computer being a first terminal of a first user, from among a group of users, to perform operations for communicating with one or more terminals of one or more other users of the group via an information processing apparatus, the operations including:
- receiving from the first user a selection of a part of users belonging to the group;
- receiving from the first user a selection of a displaying aspect from among a plurality of different displaying aspects;
- displaying on a screen, using the selected displaying aspect, first content, the first content being content one or more senders of which are users from among the selected part of the users, the selected displaying aspect being different from a displaying aspect of other contents;
- transmitting to the information processing apparatus, based on a command from the first user, a request for activating an individual process of individually transmitting or receiving content with one or more terminals of one or more users included in the selected part of the users;
- executing the individual process based on receiving a response indicating that the individual process has been activated; and
- incorporating a portion of the first content into the individual process, the portion of the first content being provided to the group of users during a period.

14. The non-transitory computer-readable recording medium as claimed in claim 13, wherein the operations include displaying both the content transmitted and received in the individual process and the portion of the first content on the screen.

15. The non-transitory computer-readable recording medium as claimed in claim 14, wherein the portion of the first content includes content transmitted from the first terminal whose sender is the first user, during the period.

16. The non-transitory computer-readable recording medium as claimed in claim 13, wherein the portion of the first content includes a respective read state of each of a plurality of messages included in the first content.

17. A first terminal of a first user, from among a group of users, to communicate with one or more terminals of one or more other users of the group via an information processing apparatus, the first terminal comprising:
- memory storing computer-executable instructions; and
- a processor configured to execute the computer-executable instructions such that the first terminal is configured to perform operations including,
  - receiving from the first user a selection of a part of users belonging to the group;
  - receiving from the first user a selection of a displaying aspect from among a plurality of different displaying aspects;
  - displaying on a screen, using the selected displaying aspect, first content, the first content being content one or more senders of which are users from among the selected part of the users, the selected displaying aspect being different from a displaying aspect of other contents;
  - transmitting to the information processing apparatus, based on a command from the first user, a request for activating an individual process of individually transmitting or receiving content with one or more terminals of one or more users included in the selected part of the users;
  - executing the individual process based on receiving a response indicating that the individual process has been activated; and
  - incorporating a portion of the first content into the individual process, the portion of the first content being provided to the group of users during a period.

18. The first terminal as claimed in claim 17, wherein the operations include displaying both the content transmitted and received in the individual process and the portion of the first content on the screen.

19. The first terminal as claimed in claim 18, wherein the portion of the first content includes content transmitted from the first terminal whose sender is the first user, during the period.

20. The first terminal as claimed in claim 17, wherein the portion of the first content includes a respective read state of each of a plurality of messages included in the first content.

* * * * *